United States Patent
Sasaki

(10) Patent No.: US 11,636,977 B2
(45) Date of Patent: Apr. 25, 2023

(54) MULTILAYER CERAMIC CAPACITOR

(71) Applicant: Murata Manufacturing Co., Ltd., Nagaokakyo (JP)

(72) Inventor: Tomohiro Sasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/399,163

(22) Filed: Aug. 11, 2021

(65) Prior Publication Data

US 2022/0068561 A1 Mar. 3, 2022

(30) Foreign Application Priority Data

Aug. 28, 2020 (JP) .............................. JP2020-145004

(51) Int. Cl.
*H01G 4/012* (2006.01)
*H01G 4/30* (2006.01)
*H01G 4/232* (2006.01)

(52) U.S. Cl.
CPC ............ *H01G 4/012* (2013.01); *H01G 4/232* (2013.01); *H01G 4/30* (2013.01)

(58) Field of Classification Search
CPC .................................. H01G 4/232; H01G 4/35
See application file for complete search history.

(56) References Cited

U.S. PATENT DOCUMENTS

| | | | |
|---|---|---|---|
| 2012/0250218 A1 | 10/2012 | Togashi et al. | |
| 2016/0049252 A1* | 2/2016 | Park ...................... | H01G 4/30 174/258 |
| 2016/0240314 A1* | 8/2016 | Fujii ...................... | H01G 4/232 |
| 2018/0359859 A1* | 12/2018 | Park ...................... | H01G 4/012 |
| 2021/0166875 A1* | 6/2021 | Kang ...................... | H01G 4/12 |

FOREIGN PATENT DOCUMENTS

| | | | |
|---|---|---|---|
| JP | 05335175 | A * | 12/1993 |
| JP | 09-55335 | A | 2/1997 |
| JP | 09069463 | A * | 3/1997 |
| JP | 2000-058376 | A | 2/2000 |
| JP | 2001-102243 | A | 4/2001 |
| JP | 2012-221993 | A | 11/2012 |
| JP | 2012-248571 | A | 12/2012 |
| JP | 2014-183241 | A | 9/2014 |
| JP | 2014-204081 | A | 10/2014 |
| JP | 2016-063038 | A | 4/2016 |

* cited by examiner

*Primary Examiner* — Eric W Thomas
(74) *Attorney, Agent, or Firm* — Keating & Bennett, LLP

(57) ABSTRACT

A multilayer ceramic capacitor includes a multilayer body, a first internal electrode layer extending to opposing end surfaces of the multilayer body, a second internal electrode layer extending to opposing side surfaces of the multilayer body, first and second external electrodes connected to the first internal electrode layer and provided on the opposing end surfaces, and third and fourth external electrodes connected to the second internal electrode layer and provided on the opposing side surfaces. The second internal electrode layer includes a central section in a central portion of the dielectric layer and an extending section extending to the opposing side surfaces. The first internal electrode layer is larger in number than the second internal electrode layer, at least two first internal electrode layers are successively layered, and the extending section is larger in thickness than the central section located in the central portion of the dielectric layer.

18 Claims, 11 Drawing Sheets

CROSS-SECTIONAL VIEW ALONG V-V

CROSS-SECTIONAL VIEW ALONG V-V

MULTILAYER CERAMIC CAPACITOR

CROSS REFERENCE TO RELATED APPLICATIONS

This application claims the benefit of priority to Japanese Patent Application No. 2020-145004 filed on Aug. 28, 2020. The entire contents of this application are hereby incorporated herein by reference.

BACKGROUND OF THE INVENTION

1. Field of the Invention

The present invention relates to a multilayer ceramic capacitor.

2. Description of the Related Art

A multilayer through-type capacitor with a general structure as described in Japanese Patent Laid-Open No. 2000-58376 has been known, for example, as an antinoise component of a decoupling capacitor used for stabilizing a power supply voltage supplied to an integrated circuit (IC) component that operates at a high speed or a line for power supply to an integrated circuit (IC) component. The through-type capacitor described in Japanese Patent Laid-Open No. 2000-58376 includes a general structure, and includes a ceramic element (multilayer body) including an outer surface including first and second main surfaces opposed to each other, first and second side surfaces opposed to each other, and first and second end surfaces opposed to each other. In the inside of the ceramic element, a plurality of first internal electrodes and a plurality of second internal electrodes are alternately provided in a direction of layering. The first internal electrode has opposing ends drawn to the first and second end surfaces, and the second internal electrode has opposing ends drawn to the first and second side surfaces.

In such a multilayer through-type capacitor, for lowering a capacitance, the number of internal electrodes should be reduced and hence a value of a direct-current (DC) resistance (Rdc) of the internal electrode becomes large. Accordingly, an amount of heat generation in the multilayer through-type capacitor may be large.

As in Japanese Patent Laid-Open No. 9-55335, a structure in which a plurality of through electrodes are successively layered has been known as a structure that can achieve suppression of increase in DC resistance while increase in capacitance is suppressed. Since a value of the DC resistance (Rdc) can also be made smaller while the capacitance is lowered according to the structure described in Japanese Patent Laid-Open No. 9-55335, the amount of heat generation can also be suppressed.

In an attempt to further lower a capacitance in the structure as in Japanese Patent Laid-Open No. 9-55335, however, ground electrodes drawn to opposing side surfaces of the multilayer body should be reduced. In that case, since portions of connection between the ground electrodes and the external electrodes are reduced, connectivity therebetween may not sufficiently be secured.

SUMMARY OF THE INVENTION

Preferred embodiments of the present invention provide multilayer ceramic capacitors that are each able to significantly reduce or prevent an increase in DC resistance while providing a lower capacitance and further able to secure connectivity between an internal electrode layer and an external electrode.

A multilayer ceramic capacitor according to a preferred embodiment of the present invention includes a multilayer body including a plurality of layered dielectric layers, the multilayer body including a first main surface and a second main surface opposed to each other in a height direction, a first end surface and a second end surface opposed to each other in a length direction orthogonal or substantially orthogonal to the height direction, and a first side surface and a second side surface opposed to each other in a width direction orthogonal or substantially orthogonal to the height direction and the length direction, a plurality of first internal electrode layers on the plurality of dielectric layers and extending to the first end surface and the second end surface, a plurality of second internal electrode layers on the plurality of dielectric layers and extending to the first side surface and the second side surface, a first external electrode on the first end surface and connected to the first internal electrode layers, a second external electrode on the second end surface and connected to the first internal electrode layers, a third external electrode on the first side surface and connected to the second internal electrode layers, and a fourth external electrode on the second side surface and connected to the second internal electrode layers. Each of the second internal electrode layers includes a central section located in a central portion of the dielectric layer and an extending section that extends from the central section located in the central portion of the dielectric layer to the first side surface and the second side surface. The first internal electrode layers are larger in number than the second internal electrode layers, at least two of the first internal electrode layers are successively layered, and the extending section is larger in thickness than the central section located in the central portion of the dielectric layer.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

A multilayer ceramic capacitor according to a preferred embodiment of this invention will be described. The multilayer ceramic capacitor according to the present preferred embodiment is a three-terminal multilayer ceramic capacitor.

Figure 1:
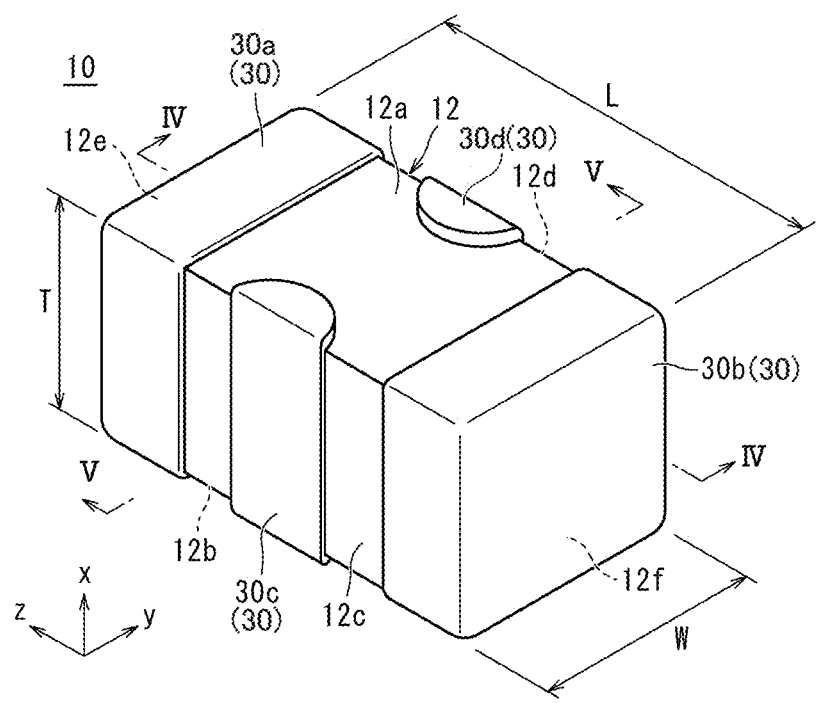
FIG. 1 is an external perspective view showing a multilayer ceramic capacitor (three-terminal multilayer ceramic capacitor) according to a preferred embodiment of the present invention.
Figure 2:
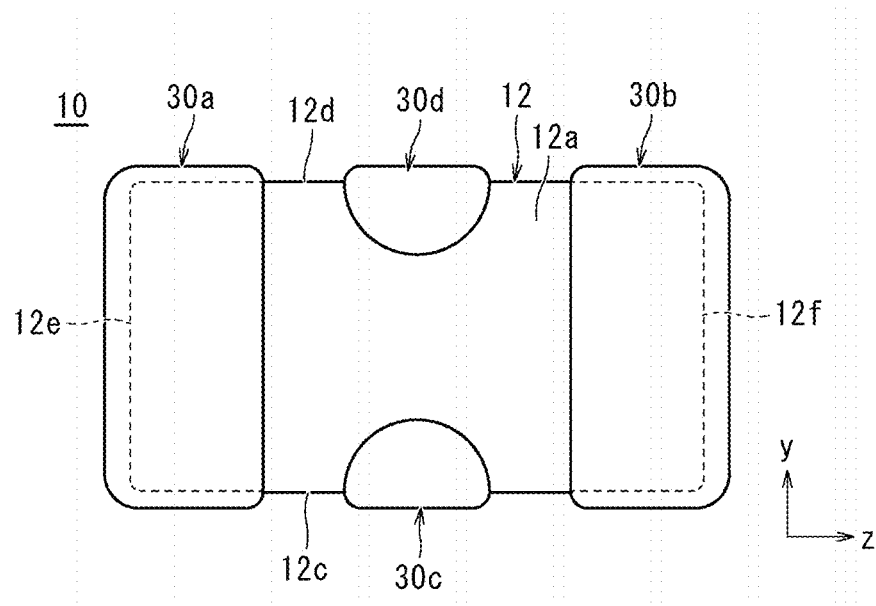
FIG. 2 is a top view showing a multilayer ceramic capacitor (three-terminal multilayer ceramic capacitor) according to a preferred embodiment of the present invention.
Figure 3:
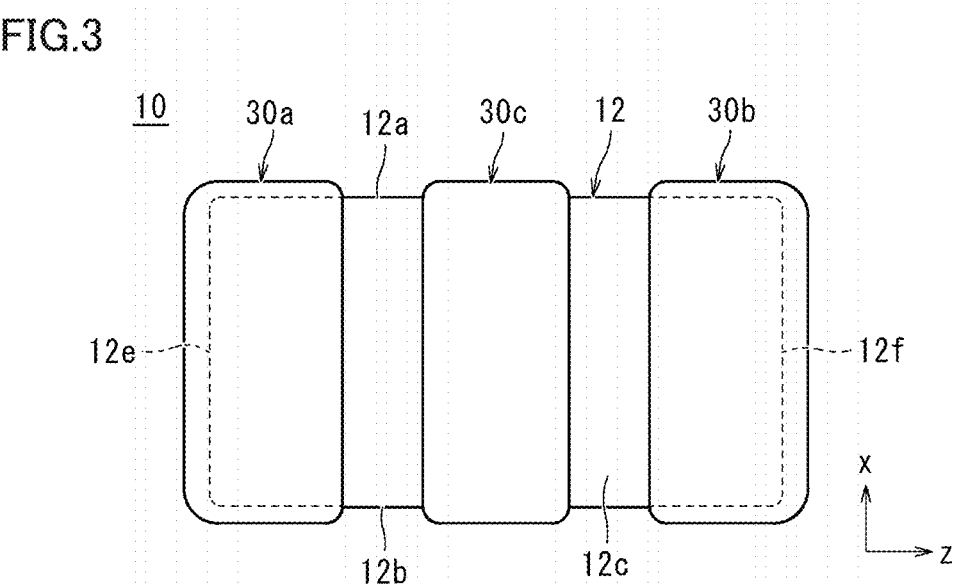
FIG. 3 is a side view showing a multilayer ceramic capacitor (three-terminal multilayer ceramic capacitor) according to a preferred embodiment of the present invention.
Figure 4:
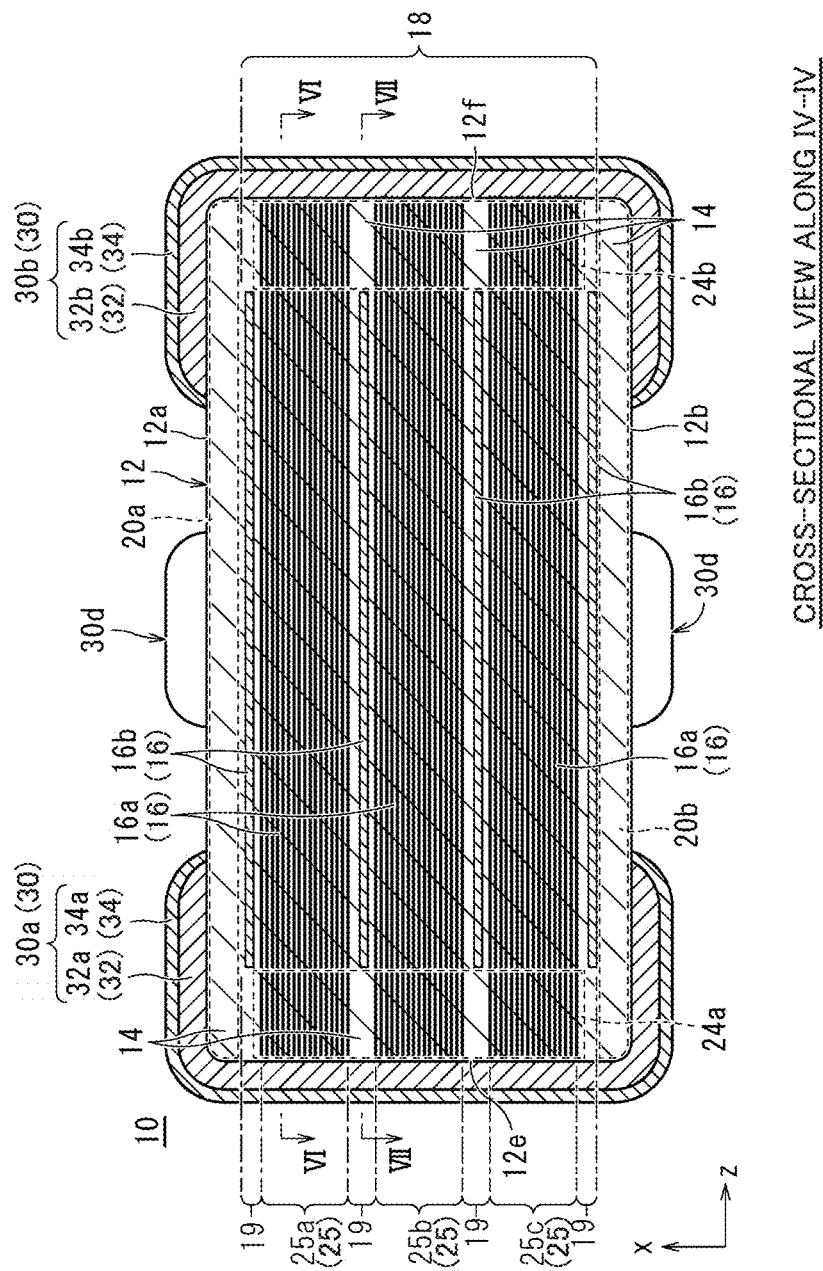
FIG. 4 is a cross-sectional view along the line IV-IV in FIG. 1.
Figure 5:
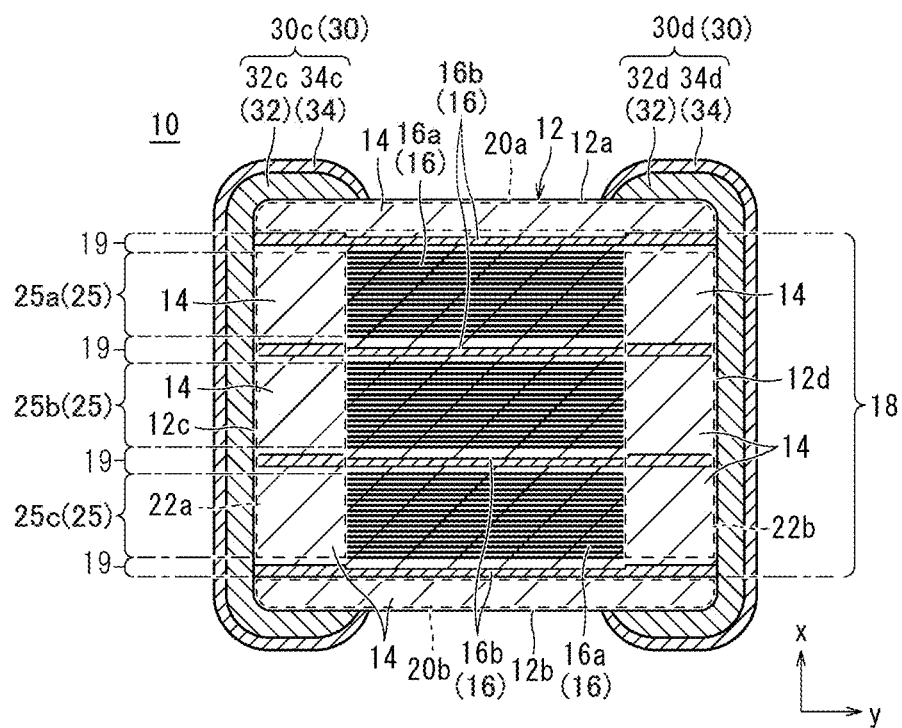
FIG. 5 is a cross-sectional view along the line V-V in FIG. 1.
Figure 6:
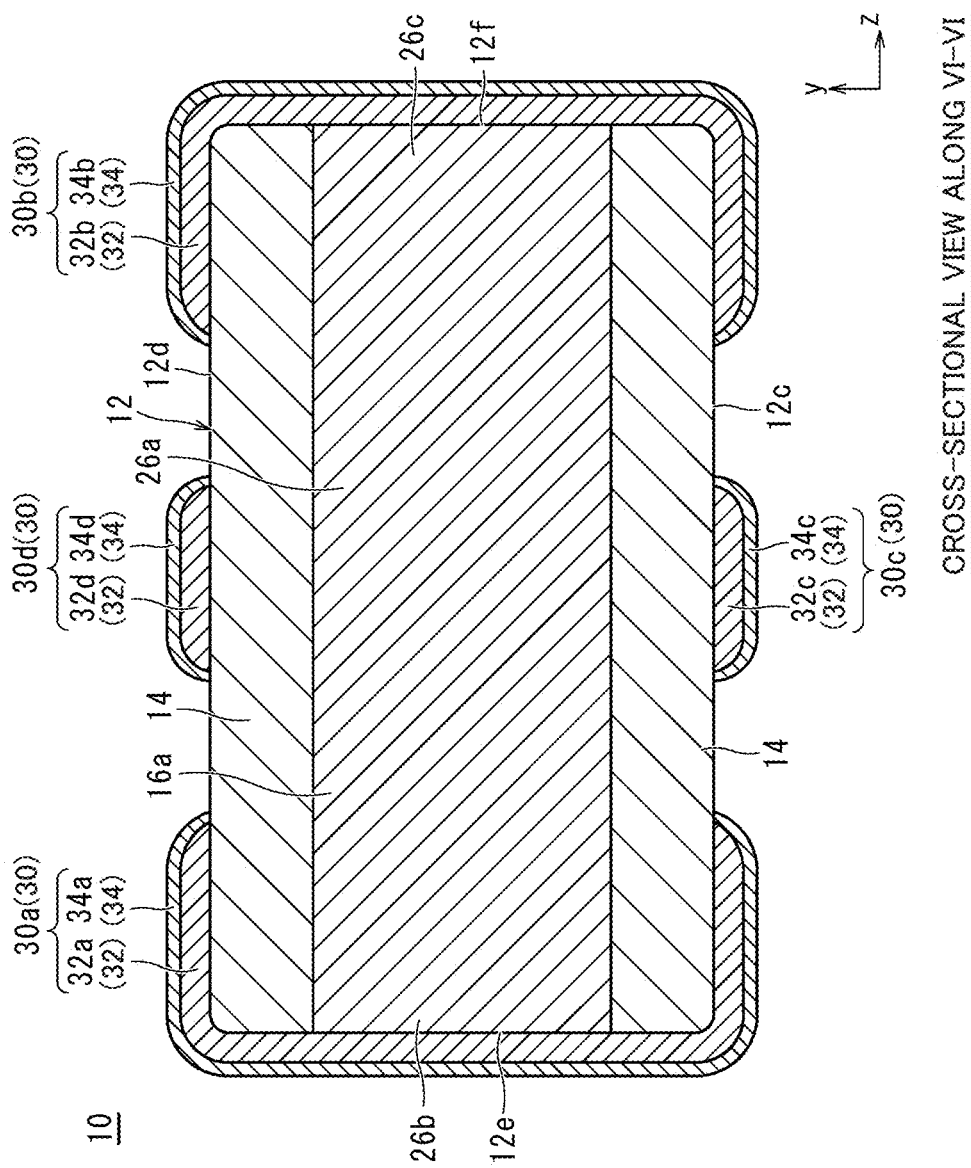
FIG. 6 is a cross-sectional view along the line VI-VI in FIG. 4.
Figure 7:
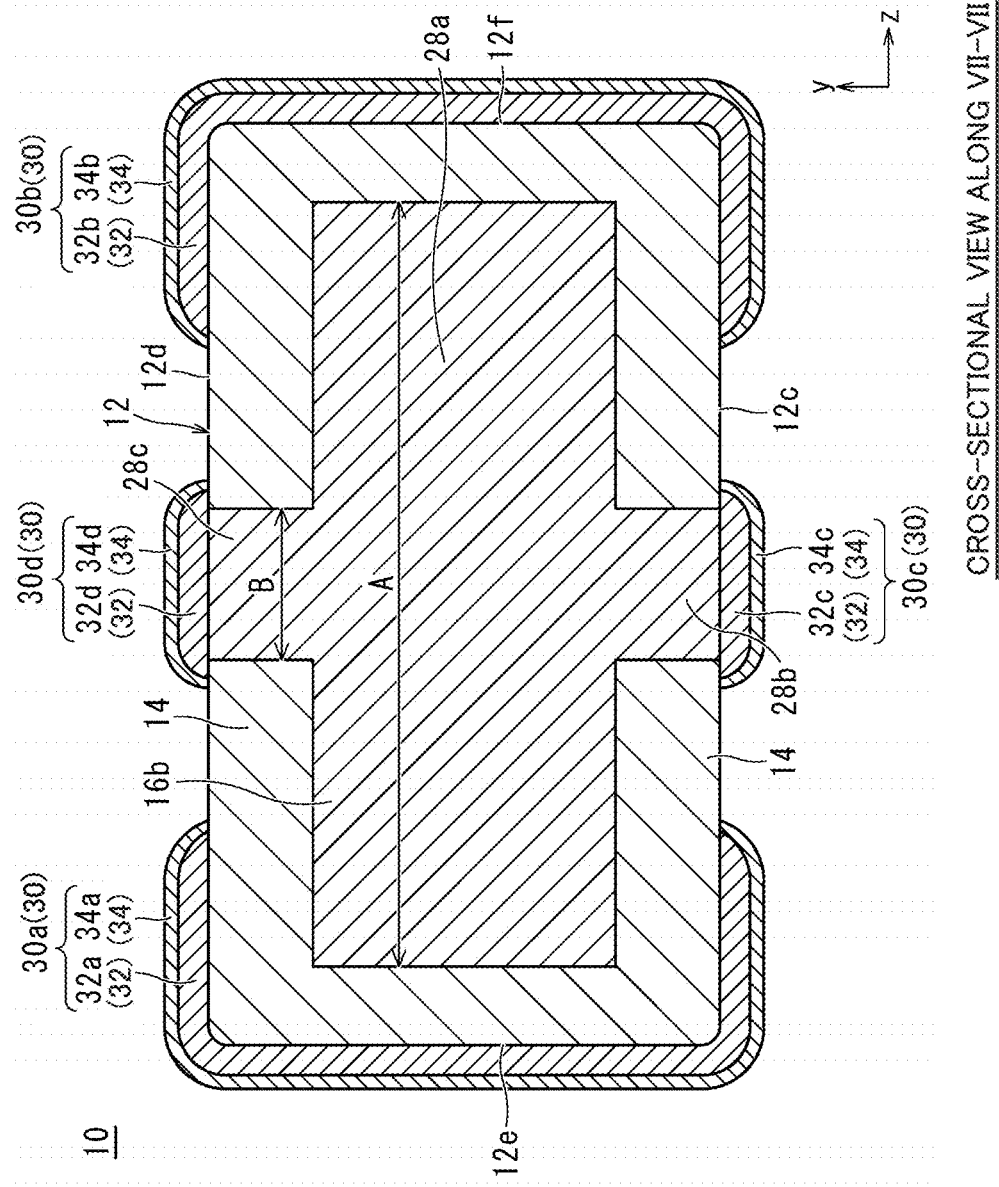
FIG. 7 is a cross-sectional view along the line VII-VII in FIG. 4.
Figure 8:
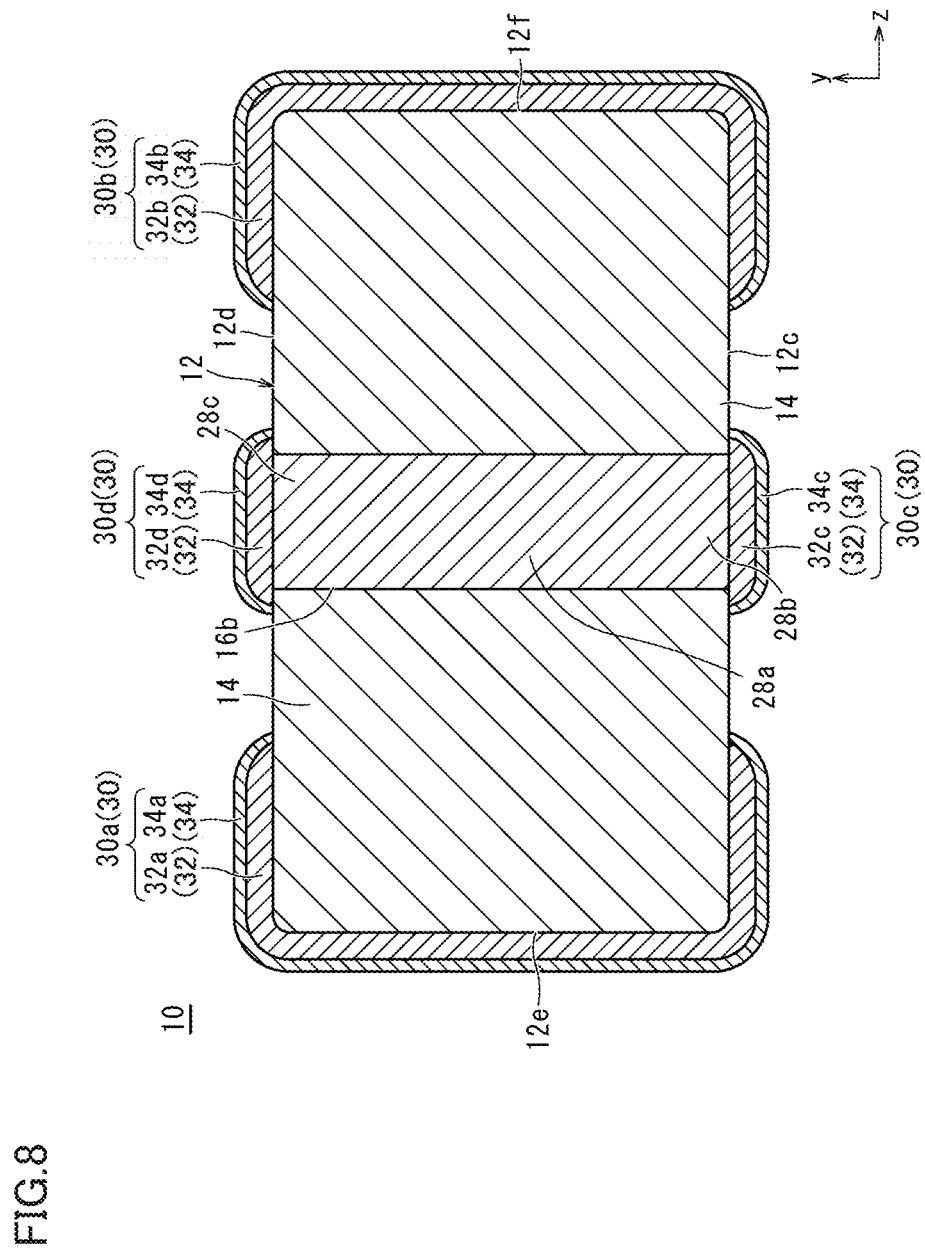
FIG. 8 shows a modification of a second internal electrode layer shown in FIG. 7.

FIG. 1 is an external perspective view showing a multilayer ceramic capacitor (three-terminal multilayer ceramic capacitor) according to a preferred embodiment of this invention. FIG. 2 is a top view showing a multilayer ceramic capacitor (three-terminal multilayer ceramic capacitor) according to a preferred embodiment of this invention. FIG. 3 is a side view showing a multilayer ceramic capacitor (three-terminal multilayer ceramic capacitor) according to a preferred embodiment of this invention. FIG. 4 is a cross-sectional view along the line IV-IV in FIG. 1. FIG. 5 is a cross-sectional view along the line V-V in FIG. 1. FIG. 6 is a cross-sectional view along the line VI-VI in FIG. 4. FIG. 7 is a cross-sectional view along the line VII-VII in FIG. 4. FIG. 8 shows a modification of a second internal electrode layer shown in FIG. 7.

As shown in FIGS. 1 to 3, a multilayer ceramic capacitor 10 includes a multilayer body 12 in a shape, for example, of a parallelepiped and an external electrode 30.

Multilayer body 12 includes a plurality of layered dielectric layers 14 and a plurality of internal electrode layers 16 layered on dielectric layer 14. Multilayer body 12 includes a first main surface 12a and a second main surface 12b opposed to each other in a height direction x, a first side surface 12c and a second side surface 12d opposed to each other in a width direction y orthogonal or substantially orthogonal to height direction x, and a first end surface 12e and a second end surface 12f opposed to each other in a length direction z orthogonal or substantially orthogonal to height direction x and width direction y. Multilayer body 12 includes a corner and a ridgeline that are rounded. The corner refers to a portion where three adjacent surfaces of the multilayer body meet one another and the ridgeline refers to a portion where two adjacent surfaces of the multilayer body meet each other. Projections and recesses or the like may be provided in a portion or an entirety of first main surface 12a and second main surface 12b, first side surface 12c and second side surface 12d, and first end surface 12e and second end surface 12f.

A dimension of multilayer body 12 is not particularly limited.

Multilayer body 12 includes an inner layer portion 18 and a first main-surface-side outer layer portion 20a and a second main-surface-side outer layer portion 20b that sandwich inner layer portion 18 in height direction x.

Inner layer portion 18 includes a plurality of dielectric layers 14 and a plurality of internal electrode layers 16. Inner layer portion 18 includes internal electrode layers from internal electrode layer 16 located closest to first main surface 12a in height direction x to internal electrode layer 16 located closest to second main surface 12b. In inner layer portion 18, the plurality of internal electrode layers 16 are opposed to each other with dielectric layer 14 being interposed therebetween. Inner layer portion 18 is a portion that produces a capacitance and substantially defines and functions as a capacitor.

First main-surface-side outer layer portion 20a is located on a side of first main surface 12a. First main-surface-side outer layer portion 20a is an assembly including a plurality of dielectric layers 14 located between first main surface 12a and internal electrode layer 16 closest to first main surface 12a.

Second main-surface-side outer layer portion 20b is located on a side of second main surface 12b. Second main-surface-side outer layer portion 20b is an assembly including a plurality of dielectric layers 14 located between second main surface 12b and internal electrode layer 16 closest to second main surface 12b.

Dielectric layers 14 included in each of first main-surface-side outer layer portion 20a and second main-surface-side outer layer portion 20b may be the same or substantially the same as dielectric layers 14 included in inner layer portion 18.

Multilayer body 12 includes a first side-surface-side outer layer portion 22a located on a side of first side surface 12c and including a plurality of dielectric layers 14 located between first side surface 12c and an outermost surface of inner layer portion 18 on the side of first side surface 12c.

Similarly, multilayer body 12 includes a second side-surface-side outer layer portion 22b located on a side of second side surface 12d and including a plurality of dielectric layers 14 located between second side surface 12d and an outermost surface of inner layer portion 18 on the side of second side surface 12d.

FIG. 5 shows a range in width direction y of each of first side-surface-side outer layer portion 22a and second side-surface-side outer layer portion 22b. Magnitude of a width in width direction y of each of first side-surface-side outer layer portion 22a and second side-surface-side outer layer portion 22b is also referred to as a W gap or a side gap.

Multilayer body 12 includes a first end-surface-side outer layer portion 24a located on a side of first end surface 12e and including a plurality of dielectric layers 14 located between first end surface 12e and an outermost surface of inner layer portion 18 on the side of first end surface 12e.

Similarly, multilayer body 12 includes a second end-surface-side outer layer portion 24b located on a side of second end surface 12f and including a plurality of dielectric layers 14 located between second end surface 12f and an outermost surface of inner layer portion 18 on the side of second end surface 12f.

FIG. 4 shows a range in length direction z of each of first end-surface-side outer layer portion 24a and second end-surface-side outer layer portion 24b. Magnitude of a width in length direction z of each of first end-surface-side outer layer portion 24a and second end-surface-side outer layer portion 24b is also referred to as an L gap or an end gap.

Dielectric layer 14 may be defined by, for example, a dielectric material as a ceramic material. For example, dielectric ceramics including a component such as $BaTiO_3$, $CaTiO_3$, $SrTiO_3$, or $CaZrO_3$ may be included as a dielectric material. When the aforementioned dielectric material is included as a main component, depending on a predetermined characteristic of multilayer body 12, for example, a sub-component lower in content than the main component, such as, for example, an Mn compound, an Fe compound, a Cr compound, a Co compound, or an Ni compound may be added.

Fired dielectric layer 14 preferably has a thickness not smaller than about 0.5 μm and not larger than about 10 μm, for example.

The number of layered dielectric layers 14 is preferably not smaller than fifteen and not larger than three hundred, for example. The number of dielectric layers 14 is a total of the number of dielectric layers 14 in inner layer portion 18 and the number of dielectric layers 14 in first main-surface-side outer layer portion 20a and second main-surface-side outer layer portion 20b.

Multilayer body 12 includes a plurality of first internal electrode layers 16a and a plurality of second internal electrode layers 16b as the plurality of internal electrode layers 16.

First internal electrode layer 16a is provided on dielectric layer 14.

As shown in FIG. 6, first internal electrode layer 16a includes a first section 26a that extends between first end surface 12e and second end surface 12f of multilayer body 12 and corresponds to a central portion thereof, a second section 26b that extends from first section 26a to first end surface 12e of multilayer body 12e, and a third section 26c that extends from first section 26a to second end surface 12f of multilayer body 12. First section 26a is located in the central portion on dielectric layer 14. Second section 26b is exposed at first end surface 12e of multilayer body 12 and third section 26c is exposed at second end surface 12f of multilayer body 12. Therefore, first internal electrode layer 16a is not exposed at first side surface 12c and second side surface 12d of multilayer body 12.

Although a shape of first internal electrode layer 16a is not particularly limited, first internal electrode layer 16a is preferably rectangular or substantially rectangular and a corner thereof may be rounded, for example.

Second internal electrode layer 16b is provided on dielectric layer 14 different from dielectric layer 14 on which first internal electrode layer 16a is provided.

As shown in FIG. 7, second internal electrode layer 16b includes a fourth section 28a that extends between first side surface 12c and second side surface 12d of multilayer body 12 and corresponds to a central portion thereof, a fifth section 28b that extends from fourth section 28a to first side surface 12c, and a sixth section 28c that extends from fourth section 28a to second side surface 12d. Fourth section 28a has a rectangular or substantially rectangular shape extending toward first end surface 12e and extending toward second end surface 12f. Fourth section 28a is located in the central portion on dielectric layer 14. Fifth section 28b is exposed at first side surface 12c of multilayer body 12 and sixth section 28c is exposed at second side surface 12d of multilayer body 12. Therefore, second internal electrode layer 16b is not exposed at first end surface 12e and second end surface 12f of multilayer body 12.

Although a shape of fourth section 28a and a shape of each of fifth section 28b and sixth section 28c of second internal electrode layer 16b are not particularly limited, the sections are preferably rectangular or substantially rectangular, for example. The corner of each section may be rounded.

First section 26a of first internal electrode layer 16a is opposed to fourth section 28a of second internal electrode layer 16b.

A width of first section 26a of first internal electrode layer 16a in width direction y that connects between first side surface 12c and second side surface 12d may be equal to or different from a width of fourth section 28a of second internal electrode layer 16b in width direction y that connects between first side surface 12c and second side surface 12d.

Relationship of A B is preferably satisfied, where A represents a width of fourth section 28a of second internal electrode layer 16b in length direction z that connects between first end surface 12e and second end surface 12f and B represents a width of fifth section 28b and sixth section 28c of second internal electrode layer 16b in length direction z that connects between first end surface 12e and second end surface 12f.

For example, as shown in FIG. 8, in a modification of second internal electrode layer 16b, fourth section 28a of second internal electrode layer 16b may not extend toward first end surface 12e and second end surface 12f and width A of fourth section 28a of second internal electrode layer 16b in length direction z that connects between first end surface 12e and second end surface 12f may be equal or substantially equal to width B of each of fifth section 28b and sixth section 28c of second internal electrode layer 16b in length direction z that connects between first end surface 12e and second end surface 12f.

Thus, by adjusting only an area of second internal electrode layer 16b without changing an area of first internal electrode layer 16a, a capacitance of multilayer ceramic capacitor 10 is able to be lowered with a DC resistance remaining low.

Although not shown, relationship of A<B may be satisfied.

First internal electrode layers 16a are larger in number than second internal electrode layers 16b, and at least two first internal electrode layers 16a are successively layered. Thus, multilayer ceramic capacitor 10 shown in FIG. 1 is not only larger in number of first internal electrode layers 16a and larger in number of first internal electrode layers 16a connected in parallel while increase in capacitance is significantly reduced or prevented, but also significantly improved in conduction between first internal electrode layers 16a and external electrode 30, and thus multilayer ceramic capacitor 10 significantly reduces or prevents an increase in DC resistance. Fifth section 28b and sixth section 28c of second internal electrode layer 16b are larger in thickness than fourth section 28a of second internal electrode layer 16b. Thus, even when the capacitance is lowered, connectivity between second internal electrode layers 16b and external electrode 30 is also able to be secured.

Though the number of first internal electrode layers 16a is not particularly limited, for example, it is preferably not smaller than thirty and not larger than one hundred.

The number of second internal electrode layers 16b is at least smaller than the number of first internal electrode layers 16a. Specifically, though the number of second internal electrode layers 16b is not particularly limited, for example, it is preferably not smaller than one and not larger than fifty.

Though a thickness of first internal electrode layer 16a is not particularly limited, for example, the thickness is preferably not smaller than about 0.5 µm and not larger than about 2.0 µm.

Though the thickness of fourth section 28a of second internal electrode layer 16b is not particularly limited, for example, the thickness is preferably not smaller than about 0.5 µm and not larger than about 2.0 µm.

Fifth section 28b and sixth section 28c of second internal electrode layer 16b are larger in thickness than fourth section 28a of second internal electrode layer 16b. Specifically, though the thickness of fifth section 28b and sixth section 28c of second internal electrode layer 16b is not particularly limited, for example, the thickness is preferably not smaller than about 1 µm and not larger than about 3 µm.

The thickness of fourth section 28a of second internal electrode layer 16b and the thickness of fifth section 28b and sixth section 28c of second internal electrode layer 16b preferably satisfy relationship of the thickness of the fifth section and the sixth section of the second internal electrode layer/the thickness of the fourth section of the second internal electrode layer about 1.2. Thus, even when a smaller number of second internal electrode layers 16b are layered, connectivity between second internal electrode layers 16b and external electrode 30 is able to be further improved.

Inner layer portion 18 of multilayer body 12 includes a capacitance forming portion 19 in which first internal electrode layer 16a and second internal electrode layer 16b are opposed to each other with dielectric layer 14 being interposed therebetween to define a capacitance and an internal electrode layered portion 25 which is a region where at least two first internal electrode layers 16a are successively layered. Multilayer ceramic capacitor 10 exhibits characteristics of the capacitor due to capacitance forming portion 19.

Internal electrode layered portion 25 is divided into a plurality of internal electrode layered portions by second internal electrode layers 16b. Since an assembly of first internal electrode layers 16a is thus distributed, a heat radiation effect is able to be improved and a reduction or prevention of a temperature increase is able to be provided.

In multilayer ceramic capacitor 10 shown in FIG. 1, internal electrode layered portion 25 is divided by two second internal electrode layers 16b into a first internal electrode layered portion 25a, a second internal electrode layered portion 25b, and a third internal electrode layered portion 25c as shown in FIG. 4.

A single second internal electrode layer 16b may divide internal electrode layered portion 25 which is the region where at least two first internal electrode layers 16a are successively layered. A larger number of first internal electrode layers 16a is thus able to be layered and a DC resistance lowering effect is able to be provided.

At least two second internal electrode layers 16b may be successively layered to divide internal electrode layered portion 25 which is the region where at least two first internal electrode layers 16a are successively layered. Thus, even when the number of second internal electrode layers 16b is smaller, connectivity between second internal electrode layers 16b and external electrode 30 is able to be increased.

Second internal electrode layer 16b may be provided in internal electrode layered portion 25 which is the region where at least two first internal electrode layers 16a located on the side of first main surface 12a of multilayer body 12 are successively layered, that is, between first internal electrode layered portion 25a and first main surface 12a, and in internal electrode layered portion 25 which is the region where at least two first internal electrode layers 16a located on the side of second main surface 12b of multilayer body 12 are successively layered, that is, between third internal electrode layered portion 25c and second main surface 12b. Since capacitance forming portion 19 is thus able to be provided also around first main-surface-side outer layer portion 20a and second main-surface-side outer layer portion 20b, some of the capacitance is provided, a current path to a mount substrate is able to be relatively short, and a relatively low ESL effect is able to be provided.

Second internal electrode layer 16b does not have to be provided in internal electrode layered portion 25 which is the region where at least two first internal electrode layers 16a located on the side of first main surface 12a of multilayer body are successively layered, that is, between first internal electrode layered portion 25a and first main surface 12a, and in internal electrode layered portion 25 which is the region where at least two first internal electrode layers 16a located on the side of second main surface 12b of multilayer body 12 are successively layered, that is, between third internal electrode layered portion 25c and second main surface 12b. A distance from the surface of multilayer body 12 to capacitance forming portion 19 where the capacitance is formed is thus longer. Therefore, even when a crack runs from the surface of multilayer body 12 due to external load, an effect of lower tendency toward deterioration of insulation resistance is able to be provided.

Dielectric layer 14 adjacent to second internal electrode layer 16b is preferably larger in thickness than dielectric layer 14 lying between first internal electrode layers 16a. A larger number of first internal electrode layers 16a is thus able to be layered, and the DC resistance lowering effect is able to further increased.

First internal electrode layer 16a and second internal electrode layer 16b may be made of an appropriate conductive material including, for example, a metal such as Ni, Cu, Ag, Pd, or Au and an alloy including at least one of those metals, such as an Ag—Pd alloy.

External electrode 30 is provided on the side of each of first end surface 12e and second end surface 12f as well as on the side of each of first side surface 12c and second side surface 12d of multilayer body 12. External electrode 30 includes a first external electrode 30a, a second external electrode 30b, a third external electrode 30c, and a fourth external electrode 30d.

First external electrode 30a is provided on first end surface 12e of multilayer body 12. First external electrode 30a extends from first end surface 12e of multilayer body 12 to cover a portion of each of first main surface 12a, second main surface 12b, first side surface 12c, and second side surface 12d. First external electrode 30a is electrically connected to second section 26b of first internal electrode layer 16a exposed at first end surface 12e of multilayer body 12. First external electrode 30a may be provided only on first end surface 12e of multilayer body 12.

Second external electrode 30b is provided on second end surface 12f of multilayer body 12. Second external electrode 30b extends from second end surface 12f of multilayer body 12 to cover a portion of each of first main surface 12a, second main surface 12b, first side surface 12c, and second side surface 12d. Second external electrode 30b is electrically connected to third section 26c of first internal electrode layer 16a exposed at second end surface 12f of multilayer body 12. Second external electrode 30b may be provided only on second end surface 12f of multilayer body 12.

Third external electrode 30c is provided on first side surface 12c of multilayer body 12. Third external electrode 30c extends from first side surface 12c to cover a portion of each of first main surface 12a and second main surface 12b. Third external electrode 30c is electrically connected to fifth section 28b of second internal electrode layer 16b exposed at first side surface 12c of multilayer body 12. Third external electrode 30c may be provided only on first side surface 12c of multilayer body 12.

Fourth external electrode 30d is provided on second side surface 12d of multilayer body 12. Fourth external electrode 30d extends from second side surface 12d to cover a portion of each of first main surface 12a and second main surface 12b. Fourth external electrode 30d is electrically connected to sixth section 28c of second internal electrode layer 16b exposed at second side surface 12d of multilayer body 12. Fourth external electrode 30d may be provided only on second side surface 12d of multilayer body 12.

Since second internal electrode layer 16b is larger in thickness than first internal electrode layer 16a, connectivity between fifth section 28b of second internal electrode layer 16b and third external electrode 30c provided on first side surface 12c is able to be provided and connectivity between sixth section 28c of second internal electrode layer 16b and fourth external electrode 30d provided on second side surface 12d is able to be provided.

As long as the thickness of first internal electrode layer 16a and the thickness of second internal electrode layer 16b satisfy relationship of the thickness of the second internal electrode layer/the thickness of the first internal electrode layer about 1.2, connectivity between fifth section 28b of second internal electrode layer 16b and third external electrode 30c provided on first side surface 12c is able to be provided and connectivity between sixth section 28c of second internal electrode layer 16b and fourth external electrode 30d provided on second side surface 12d is able to be provided even when the number of second internal electrode layers 16b is relatively low.

External electrode 30 includes an underlying electrode layer 32 provided on the surface of multilayer body 12 and a plated layer 34 covering underlying electrode layer 32.

Underlying electrode layer 32 includes a first underlying electrode layer 32a, a second underlying electrode layer 32b, a third underlying electrode layer 32c, and a fourth underlying electrode layer 32d.

First underlying electrode layer 32a is provided on the surface of first end surface 12e of multilayer body 12 and extends from first end surface 12e to cover a portion of each of first main surface 12a, second main surface 12b, first side surface 12c, and second side surface 12d.

Second underlying electrode layer 32b is provided on the surface of second end surface 12f of multilayer body 12 and extends from second end surface 12f to cover a portion of each of first main surface 12a, second main surface 12b, first side surface 12c, and second side surface 12d.

First underlying electrode layer 32a may be provided only on the surface of first end surface 12e of multilayer body 12 and second underlying electrode layer 32b may be provided only on the surface of second end surface 12f of multilayer body 12.

Third underlying electrode layer 32c is provided on the surface of first side surface 12c of multilayer body 12 and extends from first side surface 12c to cover a portion of each of first main surface 12a and second main surface 12b.

Fourth underlying electrode layer 32d is provided on the surface of second side surface 12d of multilayer body 12 and extends from second side surface 12d to cover a portion of each of first main surface 12a and second main surface 12b.

Third underlying electrode layer 32c may be provided only on the surface of first side surface 12c of multilayer body 12 and fourth underlying electrode layer 32d may be provided only on the surface of second side surface 12d of multilayer body 12.

Underlying electrode layer 32 includes at least one selected from a baked layer, a conductive resin layer, a thin layer, and the like.

A construction in which underlying electrode layer 32 is formed from the baked layer, the conductive resin layer, or the thin layer will be described below.

Baked Layer

The baked layer includes a glass component and a metal component. The glass component for the baked layer includes, for example, at least one selected from B, Si, Ba, Mg, Al, Li, and the like. The metal component for the baked layer includes at least one selected, for example, from Cu, Ni, Ag, Pd, an Ag—Pd alloy, Au, and the like. The baked layer may include a plurality of layers. The baked layer is provided by applying a conductive paste including a glass component and a metal component to multilayer body 12 and baking the conductive paste. The baked layer may be provided by simultaneously firing a multilayer chip including internal electrode layers 16 and dielectric layers 14 and the conductive paste applied to the multilayer chip, or may be provided by firing a multilayer chip including internal electrode layers 16 and dielectric layers 14 to provide multilayer body 12 and thereafter applying a conductive paste to multilayer body 12 and baking multilayer body 12. When the baked layer is provided by simultaneously firing the multilayer chip including internal electrode layers 16 and dielectric layers 14 and the conductive paste applied to the multilayer chip, the baked layer is preferably formed, for example, by baking a material to which a dielectric material is added instead of the glass component.

A thickness in the direction of connection between first end surface 12e and second end surface 12f, of first underlying electrode layer 32a located on first end surface 12e at the central portion in height direction x is preferably not smaller than about 3 µm and not larger than about 70 µm, for example.

A thickness in the direction of connection between first end surface 12e and second end surface 12f, of second underlying electrode layer 32b located on second end surface 12f at the central portion in height direction x is preferably not smaller than about 3 µm and not larger than about 70 µm, for example.

When underlying electrode layer 32 is provided on a portion of first main surface 12a and a portion of second main surface 12b as well as on a portion of first side surface 12c and a portion of second side surface 12d, a thickness of first underlying electrode layer 32a located on first main surface 12a and second main surface 12b and on first side surface 12c and second side surface 12d in the height direction of connection between first main surface 12a and second main surface 12b at a central portion in length direction z is preferably, for example, not smaller than about 3 µm and not larger than about 40 µm.

When underlying electrode layer 32 is provided on a portion of first main surface 12a and a portion of second main surface 12b as well as on a portion of first side surface 12c and a portion of second side surface 12d, a thickness of second underlying electrode layer 32b located on first main surface 12a and second main surface 12b and on first side surface 12c and second side surface 12d in the height direction of connection between first main surface 12a and second main surface 12b at a central portion in length direction z is preferably, for example, not smaller than about 3 μm and not larger than about 40 μm.

Conductive Resin Layer

The conductive resin layer may include a plurality of layers.

The conductive resin layer may be provided on the baked layer to cover the bakes layer, or may directly be provided on multilayer body 12.

The conductive resin layer includes a thermosetting resin and a metal.

The conductive resin layer may completely cover underlying electrode layer 32 or may cover a portion of underlying electrode layer 32.

Since the conductive resin layer includes a thermosetting resin, it is more flexible than a conductive layer formed, for example, from a plated film or a fired product of a conductive paste. Therefore, even though a physical shock or a shock originating from a thermal cycle is applied to multilayer ceramic capacitor 10, the conductive resin layer defines and functions as a buffer layer and is able to significantly reduce or prevent a crack in multilayer ceramic capacitor 10.

For example, Ag, Cu, Ni, Sn, Bi, or an alloy thereof may be included as a metal to be included in the conductive resin layer.

Alternatively, metal powders with a surface coated with Ag are also able to be included. In including metal powders having a surface coated with Ag, Cu, Ni, Sn, Bi, or powders of an alloy thereof is/are preferably used for the metal powders, for example. Conductive metal powders of Ag are used as a conductive metal because Ag is suitable as an electrode material because of its specific resistance lowest among metals and Ag which is a precious metal is not oxidized and highly weather resistant and because a metal as a base material is relatively inexpensive while the characteristics of Ag are maintained.

Cu or Ni subjected to antioxidation treatment can also be used as a metal included in the conductive resin layer.

Metal powders having a surface coated with, for example, Sn, Ni, or Cu are also able to be used as a metal to be included in the conductive resin layer. In providing metal powders having a surface coated with Sn, Ni, or Cu, Ag, Cu, Ni, Sn, or Bi or powders of an alloy thereof is/are preferably provided for the metal powders, for example.

The conductive resin layer preferably includes at least about 35 vol % and at most about 75 vol % of metal with respect to a volume of the conductive resin as a whole, for example.

An average particle size of the metal included in the conductive resin layer is not particularly limited. A conductive filler may have an average particle size, for example, not smaller than about 0.3 μm and not larger than about 10 μm.

The metal included in the conductive resin layer mainly provides for current conduction in the conductive resin layer. Specifically, a current conduction path is formed in the conductive resin layer as a result of contact between the conductive fillers.

Although the metal included in the conductive resin layer may be spherical or may have a flat profile, spherical metal powders and metal powders having a flat profile are preferably used as being mixed, for example.

Various known thermosetting resins, for example, an epoxy resin, a phenol resin, a urethane resin, a silicone resin, and a polyimide resin are able to be used as the resin in the conductive resin layer. Among these, the epoxy resin excellent in heat resistance, moisture resistance, and adhesiveness is one of most appropriate resins.

The conductive resin layer preferably includes at least about 25 vol % and at most about 65 vol % of resin with respect to the volume of the conductive resin as a whole, for example.

The conductive resin layer preferably includes a hardening agent together with the thermosetting resin, for example. When the epoxy resin is provided as a base resin, various known compounds, for example, a phenol-based compound, an amine-based compound, an acid anhydride-based compound, an imidazole-based compound, an active-ester-based compound, and an amide-imide-based compound may be included as the hardening agent for the epoxy resin.

The conductive resin layer located in the central portion in height direction x of multilayer body 12 located on each of first end surface 12e and second end surface 12f has a thickness, for example, preferably not smaller than about 10 μm and not larger than about 150 μm.

Thin Layer

When a thin layer is provided as underlying electrode layer 32, the thin layer is not larger than about 1 μm that is provided by deposition of metal particles by a thin film formation method, for example, sputtering or vapor deposition.

Plated layer 34 includes a first plated layer 34a, a second plated layer 34b, a third plated layer 34c, and a fourth plated layer 34d.

First plated layer 34a, second plated layer 34b, third plated layer 34c, and fourth plated layer 34d include at least one selected, for example, from Cu, Ni, Sn, Ag, Pd, an Ag—Pd alloy, Au, and the like.

First plated layer 34a covers first underlying electrode layer 32a.

Second plated layer 34b covers second underlying electrode layer 32b.

Third plated layer 34c covers third underlying electrode layer 32c.

Fourth plated layer 34d covers fourth underlying electrode layer 32d.

Plated layer 34 may include a plurality of layers. In this case, plated layer 34 preferably has a two-layered structure including a lower plated layer of Ni plating provided on underlying electrode layer 32 and an upper plated layer of Sn plating provided on the lower plated layer, for example.

Specifically, first plated layer 34a includes a first lower plated layer and a first upper plated layer located on a surface of the first lower plated layer.

Second plated layer 34b includes a second lower plated layer and a second upper plated layer located on a surface of the second lower plated layer.

Third plated layer 34c includes a third lower plated layer and a third upper plated layer located on a surface of the third lower plated layer.

Fourth plated layer 34d includes a fourth lower plated layer and a fourth upper plated layer located on a surface of the fourth lower plated layer.

The lower plated layer of Ni plating is included to significantly reduce or prevent corrosion of underlying electrode layer 32 by solder that mounts of multilayer ceramic capacitor 10 and the upper plated layer of Sn plating is included to increase wettability of solder that mounts of multilayer ceramic capacitor 10.

One plated layer has a thickness preferably not smaller than about 2.0 μm and not larger than about 15.0 μm, for example.

External electrode 30 may be provided only from a plated layer without providing underlying electrode layer 32.

A structure where a plated layer is provided without underlying electrode layer 32 will be described below, although it is not shown.

Any one or each of first external electrode 30a to fourth external electrode 30d may include no underlying electrode layer 32, and may include the plated layer directly provided on the surface of multilayer body 12. In other words, multilayer ceramic capacitor 10 may be structured to include a plated layer electrically connected to first internal electrode layer 16a and second internal electrode layer 16b. In such a case, the plated layer may be formed after a catalyst is provided on the surface of multilayer body 12 as pretreatment.

When the plated layer is formed directly on multilayer body 12 without providing underlying electrode layer 32, reduction in thickness by magnitude of the thickness of underlying electrode layer 32 is able to provide a lower profile, that is, decrease in thickness, or into a thickness of multilayer body 12, that is, a thickness of inner layer portion 18. Therefore, a degree of freedom in design of a thin chip is able to be significantly improved.

The plated layer preferably includes a lower plated electrode formed on the surface of multilayer body 12 and an upper plated electrode formed on a surface of the lower plated electrode, for example. Each of the lower plated electrode and the upper plated electrode preferably includes at least one metal selected, for example, from Cu, Ni, Sn, Pb, Au, Ag, Pd, Bi, and Zn or an alloy including such a metal.

The lower plated electrode preferably includes Ni that provides a solder barrier and the upper plated electrode preferably includes Sn or Au excellent in solderability, for example.

For example, when first internal electrode layer 16a and second internal electrode layer 16b include Ni, the lower plated electrode preferably includes Cu that is well joined to Ni, for example. The upper plated electrode should only be included as necessary, and each of first external electrode 30a to fourth external electrode 30d may be formed only from the lower plated electrode. The upper plated electrode may define and function as and define an outermost layer of the plated layer, or another plated electrode may further be formed on a surface of the upper plated electrode.

When external electrode 30 is formed only from the plated layer without underlying electrode layer 32, one plated layer without including underlying electrode layer 32 has a thickness preferably not smaller than about 1 μm and not larger than about 15 μm, for example.

The plated layer preferably includes no glass, for example. A ratio of a metal per unit volume of the plated layer is preferably not lower than about 99 volume %, for example.

A dimension in length direction z of multilayer ceramic capacitor 10 including multilayer body 12 and first external electrode 30a to fourth external electrode 30d is defined as an L dimension, a dimension in height direction x of multilayer ceramic capacitor 10 including multilayer body 12 and first external electrode 30a to fourth external electrode 30d is defined as a T dimension, and a dimension in width direction y of multilayer ceramic capacitor 10 including multilayer body 12 and first external electrode 30a to fourth external electrode 30d is defined as a W dimension.

Although the dimension of multilayer ceramic capacitor 10 is not particularly limited, for example, multilayer ceramic capacitor 10 has the L dimension in length direction z not smaller than about 1.0 mm and not larger than about 3.2 mm, the W dimension in width direction y not smaller than about 0.5 mm and not larger than about 2.5 mm, and the T dimension in height direction x not smaller than about 0.3 mm and not larger than about 2.5 mm. The dimension of multilayer ceramic capacitor 10 may be measured with a microscope.

In multilayer ceramic capacitor 10 shown in FIG. 1, the number of first internal electrode layers 16a is larger than the number of second internal electrode layers 16b and at least two first internal electrode layers 16a are successively layered. Therefore, multilayer ceramic capacitor 10 provides improved conduction from first internal electrode layer 16a and second internal electrode layer 16b to external electrode 30 while increase in capacitance thereof is reduced or prevented, and thus multilayer ceramic capacitor 10 reduces or prevents an increase in DC resistance.

In multilayer ceramic capacitor 10 shown in FIG. 1, fifth section 28b and sixth section 28c of second internal electrode layer 16b are larger in thickness than fourth section 28a of second internal electrode layer 16b. Therefore, even when the number of second internal electrode layers 16b is reduced in order to lower the capacitance of multilayer ceramic capacitor 10, connectivity between second internal electrode layers 16b and third external electrode 30c and connectivity between second internal electrode layers 16b and fourth external electrode 30d is able to be provided.

2. Method of Manufacturing Multilayer Ceramic Capacitor

A method of manufacturing a multilayer ceramic capacitor according to a preferred embodiment of the present invention will now be described.

Initially, a dielectric sheet for a dielectric layer and a conductive paste for an internal electrode are prepared. The dielectric sheet and the conductive paste for the internal electrode layer include a binder and a solvent. A known binder or a known solvent may be used.

The conductive paste for the internal electrode layer is printed in a prescribed pattern on the dielectric sheet, for example, by screen printing or gravure printing. The dielectric sheet having a pattern of the first internal electrode layer formed and the dielectric sheet having a pattern of the second internal electrode layer formed are thus prepared.

More specifically, a screen plate to print the first internal electrode layer and a screen plate to print the second internal electrode layer are separately prepared, and the pattern of each internal electrode layer may be printed by a printer that is able to perform separate printing with the two types of screen plates. A portion to be the fifth section and the sixth section of the pattern of the second internal electrode layer is printed as being larger in thickness than a portion to be the fourth section of the pattern of the second internal electrode layer.

By layering the sheets each having the first internal electrode layer printed and the sheets each having the second internal electrode layer printed to provide a desired structure, a portion to be inner layer portion 18 is formed. The sheet having the first internal electrode layer printed is larger in number than the sheet having the second internal electrode layer printed, and at least two sheets having the first internal electrode layer printed are successively layered.

Then, a prescribed number of dielectric sheets with no pattern of the internal electrode layer printed are layered to define a portion to be second main-surface-side outer layer portion 20b on the side of the second main surface. Thereafter, the portion to be inner layer portion 18 formed in the step described above is layered on the portion to be second main-surface-side outer layer portion 20b, and a prescribed number of dielectric sheets having no pattern of the internal electrode layer printed are layered on the portion to be inner layer portion 18. A portion to be first main-surface-side outer layer portion 20a on the side of the first main surface is thus formed. A layered sheet is thus provided.

In succession, the layered sheet is pressed in a direction of layering, for example, by isostatic pressing, to provide a multilayer block.

Then, the multilayer block is cut in a prescribed size to provide a multilayer chip. A corner and a ridgeline of the multilayer chip may be rounded by barrel polishing.

Then, the cut multilayer chip is fired to provide multilayer body 12. A temperature of firing is preferably not lower than about 900° C. and not higher than about 1400° C., for example, although it is dependent on a material of dielectric layer 14 or internal electrode layer 16.

Underlying Electrode Layer

In succession, third underlying electrode layer 32c of third external electrode 30c is formed on first side surface 12c of multilayer body 12 provided by firing, and fourth underlying electrode layer 32d of fourth external electrode 30d is formed on second side surface 12d of multilayer body 12.

In forming the baked layer as underlying electrode layer 32, a conductive paste including a glass component and a metal component is applied and thereafter baked to define the baked layer as underlying electrode layer 32. A temperature of baking at this time is preferably not lower than about 700° C. and not higher than about 900° C., for example.

Various methods may be implemented as the method of forming the baked layer. For example, a method of extruding a conductive paste through a slit and applying the conductive paste may be applied. In this method, by increasing an amount of the extruded conductive paste, underlying electrode layer 32 is able to be formed not only on first side surface 12c and second side surface 12d but also on a portion of first main surface 12a and a portion of second main surface 12b.

A roller transfer method is also able be implemented. In the roller transfer method, in forming underlying electrode layer 32 not only on first side surface 12c and second side surface 12d but also on a portion of first main surface 12a and a portion of second main surface 12b, by increasing a pressure in pressing in roller transfer, underlying electrode layer 32 may be formed as far as a portion of first main surface 12a and a portion of second main surface 12b.

Then, first underlying electrode layer 32a of first external electrode 30a is formed on first end surface 12e of multilayer body 12 provided by firing and second underlying electrode layer 32b of second external electrode 30b is formed on second end surface 12f of multilayer body 12.

In forming the baked layer as underlying electrode layer 32 as in forming underlying electrode layer 32 of each of third external electrode 30c and fourth external electrode 30d, a conductive paste including a glass component and a metal component is applied and thereafter baked to define the baked layer as underlying electrode layer 32. A temperature of baking at this time is preferably not lower than about 700° C. and not higher than about 900° C., for example.

In a method of forming the baked layer as underlying electrode layer 32 of each of first external electrode 30a and second external electrode 30b, a method of extruding a conductive paste through a slit and applying the conductive paste or a roller transfer method may be applied.

In baking, third underlying electrode layer 32c of third external electrode 30c, fourth underlying electrode layer 32d of fourth external electrode 30d, first underlying electrode layer 32a of first external electrode 30a, and second underlying electrode layer 32b of second external electrode 30b may simultaneously be baked, or third underlying electrode layer 32c of third external electrode 30c and fourth underlying electrode layer 32d of fourth external electrode 30d may be baked separately from first underlying electrode layer 32a of first external electrode 30a and second underlying electrode layer 32b of second external electrode 30b.

Conductive Resin Layer

When underlying electrode layer 32 is formed from a conductive resin layer, the conductive resin layer is able to be formed by a method below. The conductive resin layer may be formed on a surface of the baked layer or the conductive resin layer alone may directly be formed on multilayer body 12 without forming the baked layer.

In the method of forming a conductive resin layer, the conductive resin layer is formed by applying a conductive resin paste including a thermosetting resin and a metal component onto the baked layer or multilayer body 12, subjecting the conductive resin paste to heat treatment at a temperature not lower than about 250° C. and not higher than about 550° C., for example, and thermally curing the resin. An $N_2$ atmosphere is preferably provided as an atmosphere for heat treatment, for example. In order to prevent scattering of the resin and oxidation of various metal components, a concentration of oxygen is preferably reduced to about 100 ppm or lower, for example.

For example, the method of extruding a conductive resin paste through a slit and applying the conductive resin paste or the roller transfer method is able to be applied as the method of applying the conductive resin paste, as in the method of forming underlying electrode layer 32 from the baked layer.

Thin Layer

In forming underlying electrode layer 32 from a thin layer, the underlying electrode layer is able to be formed at a predetermined location where external electrode 30 is to be formed by using masking or the like, with a thin film formation method, for example, sputtering or vapor deposition. The underlying electrode layer formed from the thin layer is a layer not larger than about 1 μm that results from deposition of metal particles.

Plated Electrode

A plated electrode may be provided in second section 26b, third section 26c, fifth section 28b, and sixth section 28c where internal electrode layer 16 of multilayer body 12 is exposed, without providing underlying electrode layer 32. In this case, the plated electrode is able to be formed by a method below.

First end surface 12e and second end surface 12f of multilayer body 12 are plated to form lower plated electrodes on second section 26b and third section 26c which are the exposed portions of first internal electrode layer 16a, respectively. Similarly, first side surface 12c and second side surface 12d of multilayer body 12 are plated to form lower plated electrodes on fifth section 28b and sixth section 28c which are the exposed portions of second internal electrode layer 16b, respectively. In plating, any of electrolytic plating and electroless plating may be used. Electroless plating, however, is disadvantageous due to its complicated process, because it requires pre-treatment with a catalyst to improve a rate of precipitation of plating. Therefore, electrolytic plating is preferably used, for example. Barrel plating is preferably used as a plating method, for example. An upper plated electrode formed on a surface of the lower plated electrode may similarly be formed.

In succession, plated layer 34 may be formed on the surface of underlying electrode layer 32, the surface of the conductive resin layer or the surface of the lower plated electrode, and the surface of the upper plated electrode.

More specifically, in the present preferred embodiment, an Ni plated layer is formed as the lower plated layer on underlying electrode layer 32 which is the baked layer and an Sn plated layer is formed as the upper plated layer. The Ni plated layer and the Sn plated layer are successively formed, for example, by barrel plating. In plating, any of electrolytic plating and electroless plating may be used. Electroless plating, however, is disadvantageous due to its complicated process, because it requires pre-treatment with a catalyst to improve a rate of precipitation of plating. Therefore, electrolytic plating is preferably applied, for example.

Multilayer ceramic capacitor 10 according to the present preferred embodiment is manufactured as described above.

3. Experimental Example

In order to check advantageous effects of a multilayer ceramic capacitor according to a preferred embodiment of the present invention described above, a multilayer ceramic capacitor was manufactured as a sample in an experiment, and a heat generation characteristic test (variation in temperature with variation in current), a test to measure a DC resistance (Rdc) of the internal electrode layer, and a test to check connection between the internal electrode layer and the external electrode were conducted.

(1) Specifications of Sample in Example

A multilayer ceramic capacitor according to Example of a preferred embodiment of the present invention with specifications as below was initially made in accordance with the method of manufacturing the multilayer ceramic capacitor described above.

EXAMPLE

Structure of multilayer ceramic capacitor: three-terminal (see FIG. 1)
Dimension L×W×T of multilayer ceramic capacitor (including a designed value): about 1.6 mm×about 0.8 mm×about 0.6 mm
Material for dielectric layer: $BaTiO_3$
Capacitance: see Example 1 to Example 12 in Table 1
Rated voltage: see Example 1 to Example 12 in Table 1
Structure of LT cross-section: see FIG. 4 (the second internal electrode layers dividing the region where at least two first internal electrode layers were successively layered (internal electrode layered portion) into a plurality of regions), FIG. 4 showing Example 6
Structure of internal electrode
  First internal electrode layer
    Material: Ni
    Shape: see FIG. 6
    Number of layers: see Example 1 to Example 12 in Table 1
    Thickness: about 1.0 μm
  Second internal electrode layer
    Material: Ni
    Shape: see FIG. 7 for Example 1 to Example 6 and see FIG. 8 for Example 7 to Example 12
    Number of layers: see Example 1 to Example 12 in Table 1
    Thickness: thickness of fourth section: about 1.0 μm
    Thickness of fifth and sixth sections: about 1.5 μm
Structure of external electrode
  First external electrode and second external electrode
    Underlying electrode layer: baked layer including conductive metal (Cu) and glass component
    Thickness of end surface in central portion: about 45 μm
    Plated layer: two-layered structure of Ni plated layer and Sn plated layer
    Thickness of Ni plated layer: about 4 μm
    Thickness of Sn plated layer: about 4 μm
  Third external electrode and fourth external electrode
    Underlying electrode layer: baked layer including conductive metal (Cu) and glass component
    Thickness of end surface in central portion: about 30 μm
    Plated layer: two-layered structure of Ni plated layer and Sn plated layer
    Thickness of Ni plated layer: about 4 μm
    Thickness of Sn plated layer: about 4 μm (2) Specifications of Sample in Comparative Example In succession, multilayer ceramic capacitors according to Comparative Example 1 and Comparative Example 2 with specifications as below were made.

Comparative Example 1

As compared with the multilayer ceramic capacitor according to Example, the multilayer ceramic capacitor according to Comparative Example is a three-terminal multilayer ceramic capacitor identical to the multilayer ceramic capacitor in Example except for alternate layering of the first internal electrode layers and the second internal electrode layers and difference in number of internal electrode layers.

Figure 9:
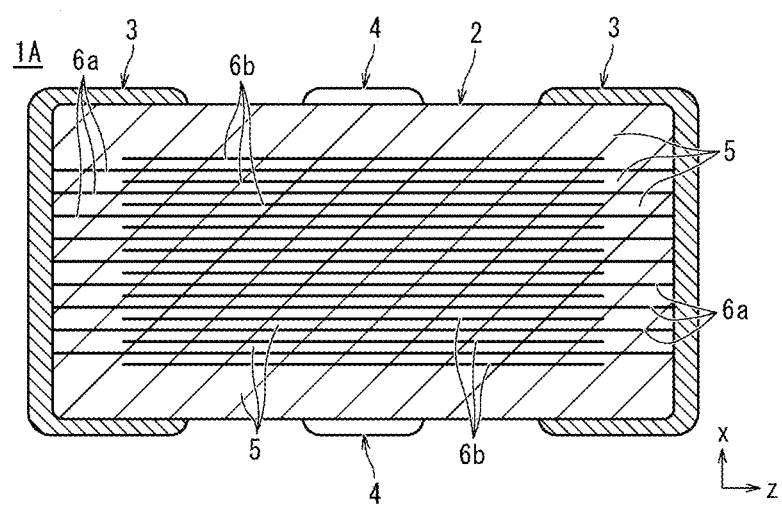
FIG. 9 is a cross-sectional view showing a multilayer ceramic capacitor (Comparative Example 1-3) according to Comparative Example 1.

FIG. 9 is a cross-sectional view showing a multilayer ceramic capacitor (Comparative Example 1-3) according to Comparative Example 1. A multilayer ceramic capacitor 1A according to Comparative Example 1 includes a multilayer body 2 in a parallelepiped shape, an external electrode 3 provided on each of opposing end surfaces, and an external electrode 4 provided on each of opposing side surfaces. Multilayer body 2 includes a plurality of layered dielectric layers 5 and a plurality of first internal electrode layers 6a and a plurality of second internal electrode layers 6b layered on dielectric layer 5. First internal electrode layers 6a and second internal electrode layers 6b are alternately layered with dielectric layers 5 being provided between first internal electrode layers 6a and second internal electrode layers 6b.

Details of the specifications will be shown below.
Structure of multilayer ceramic capacitor: three-terminal (see FIG. 9)
Dimension L×W×T of multilayer ceramic capacitor (including a designed value): about 1.6 mm×about 0.8 mm×about 0.6 mm
Material for dielectric layer: $BaTiO_3$
Capacitance: see Comparative Example 1-1 to Comparative Example 1-12 in Table 2
Rated voltage: see Comparative Example 1-1 to Comparative Example 1-12 in Table 2

Structure of LT cross-section: see FIG. 9 (the first internal electrode layer and the second electrode layer being alternately layered), FIG. 9 showing Comparative Example 1-3 in Table 2

Structure of internal electrode
- First internal electrode layer
  - Material: Ni
  - Shape: see FIG. 6
  - Number of layers: see Comparative Example 1-1 to Comparative Example 1-12 in Table 2
  - Thickness: about 1.0 μm
- Second internal electrode layer
  - Material: Ni
  - Shape: see FIG. 7 for Comparative Example 1-1 to Comparative Example 1-6 and see FIG. 8 for Comparative Example 1-7 to Comparative Example 1-12
  - Number of layers: see Comparative Example 1-1 to Comparative Example 1-12 in Table 2
  - Thickness: thickness of fourth section: about 1.0 μm
  - Thickness of fifth and sixth sections: about 1.0 μm Structure of external electrode
- First external electrode and second external electrode
  - Underlying electrode layer: baked layer including conductive metal (Cu) and glass component
  - Thickness of end surface in central portion: about 45 μm
  - Plated layer: two-layered structure of Ni plated layer and Sn plated layer
  - Thickness of Ni plated layer: about 4 μm
  - Thickness of Sn plated layer: about 4 μm
- Third external electrode and fourth external electrode
  - Underlying electrode layer: baked layer including conductive metal (Cu) and glass component
  - Thickness of end surface in central portion: about 30 μm
  - Plated layer: two-layered structure of Ni plated layer and Sn plated layer
  - Thickness of Ni plated layer: 4 μm
  - Thickness of Sn plated layer: 4 μm Comparative Example 2

As compared with the multilayer ceramic capacitor according to Example, a multilayer ceramic capacitor according to Comparative Example is a three-terminal multilayer ceramic capacitor identical to the multilayer ceramic capacitor in Example except for a thickness identical between the fourth section of the second internal electrode layer and the fifth and sixth sections of the second internal electrode layer.

Figure 10:
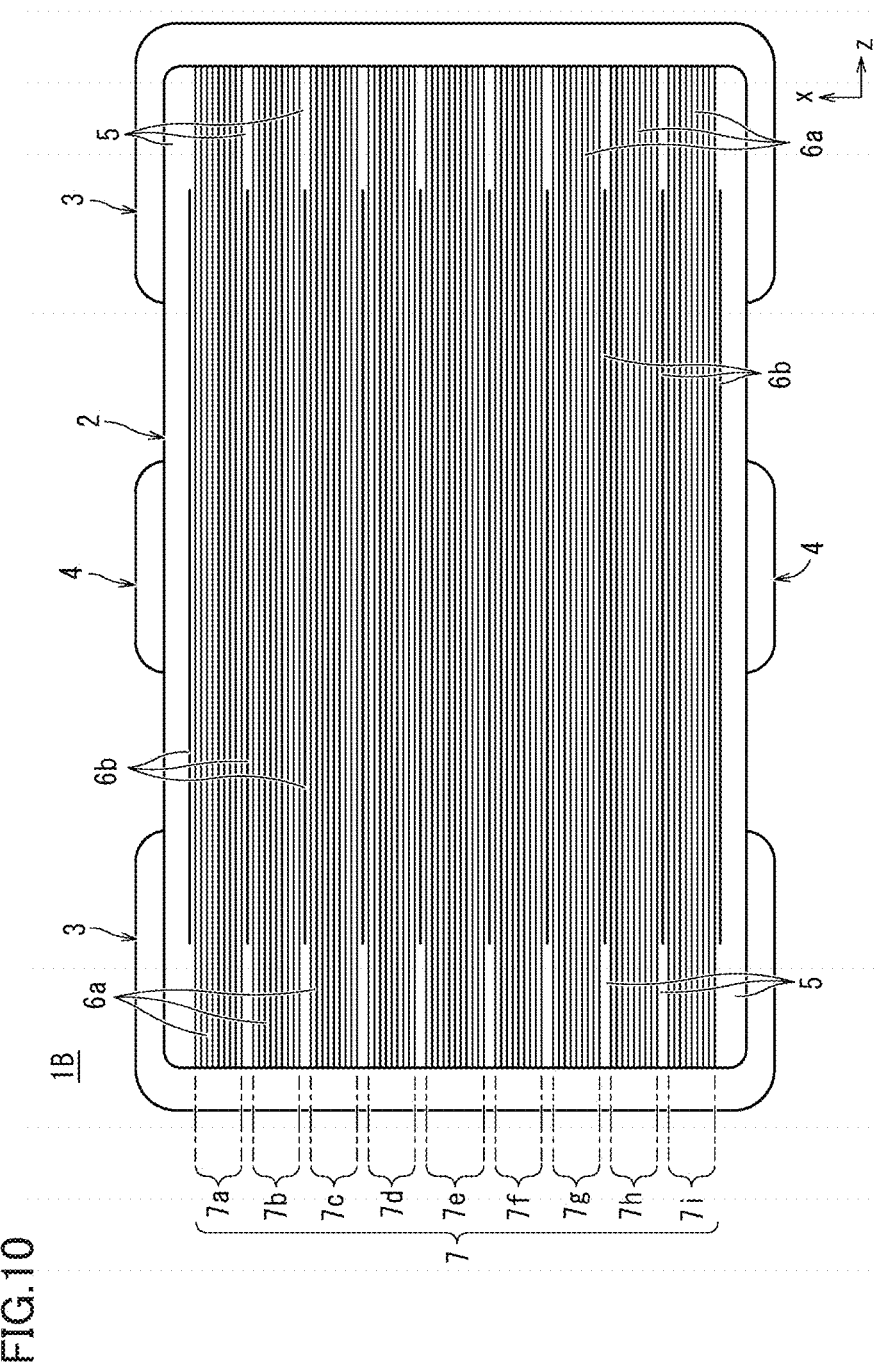
FIG. 10 is a cross-sectional view showing a multilayer ceramic capacitor (Comparative Example 2-3) according to Comparative Example 2.

FIG. 10 is a cross-sectional view showing a multilayer ceramic capacitor (Comparative Example 2-3) according to Comparative Example 2. A multilayer ceramic capacitor 1B according to Comparative Example 2 includes multilayer body 2 in a parallelepiped shape, external electrode 3 provided on each of opposing end surfaces, and external electrode 4 provided on each of opposing side surfaces. Multilayer body 2 includes a plurality of layered dielectric layers 5 and a plurality of first internal electrode layers 6a and a plurality of second internal electrode layers 6b layered on dielectric layers 5. First internal electrode layers 6a are larger in number than second internal electrode layers 6b and at least two first internal electrode layers 6a are successively layered. In multilayer ceramic capacitor 1B shown in FIG. 10, second internal electrode layers 6b divide an internal electrode layered portion 7 which is a region where at least two first internal electrodes 6a are successively layered into a plurality of internal electrode layered portions 7a, 7b, 7c, . . . , and 7i.

Details of the specifications will be shown below.

Structure of multilayer ceramic capacitor: three-terminal (see FIG. 10)
- Dimension L×W×T of multilayer ceramic capacitor (including a designed value): about 1.6 mm×about 0.8 mm×about 0.6 mm
- Material for dielectric layer: $BaTiO_3$
- Capacitance: see Comparative Example 2-1 to Comparative Example 2-12 in Table 3
- Rated voltage: see Comparative Example 2-1 to Comparative Example 2-12 in Table 3
- Structure of LT cross-section: see FIG. 10 (the second internal electrode layers dividing the region (internal electrode layered portion) where at least two first internal electrode layers were successively layered into a plurality of regions), FIG. 10 showing Comparative Example 2-3 in Table 3

Structure of internal electrode
- First internal electrode layer
  - Material: Ni
  - Shape: see FIG. 6
  - Number of layers: see Comparative Example 2-1 to Comparative Example 2-12 in Table 3
  - Thickness: about 1.0 μm
- Second internal electrode layer
  - Material: Ni
  - Shape: see FIG. 7 for Comparative Example 2-1 to Comparative Example 2-6 and see FIG. 8 for Comparative Example 2-7 to Comparative Example 2-12
  - Number of layers: see Comparative Example 2-1 to Comparative Example 2-12 in Table 3
  - Thickness of fourth section: about 1.0 μm
  - Thickness of fifth and sixth sections: about 1.0 μm Structure of external electrode
- First external electrode and second external electrode
  - Underlying electrode layer: baked layer including conductive metal (Cu) and glass component
  - Thickness of end surface in central portion: about 45 μm
  - Plated layer: two-layered structure of Ni plated layer and Sn plated layer
  - Thickness of Ni plated layer: about 4 μm
  - Thickness of Sn plated layer: about 4 μm
- Third external electrode and fourth external electrode
  - Underlying electrode layer: baked layer including conductive metal (Cu) and glass component
  - Thickness of end surface in central portion: about 30 μm
  - Plated layer: two-layered structure of Ni plated layer and Sn plated layer
  - Thickness of Ni plated layer: about 4 μm
  - Thickness of Sn plated layer: about 4 μm Tables 1 to 3 show samples in Example, Comparative Example 1, and Comparative Example 2 used in the present experimental example.

TABLE 1

|  | Rated Voltage (V) | Capacitance (nF) | The Number of Layered First Internal Electrode Layers (Count) | The Number of Layered Second Internal Electrode Layers (Count) |
| --- | --- | --- | --- | --- |
| Example 1 | 16 | 220 | 70 | 25 |
| Example 2 | 25 | 100 | 59 | 20 |
| Example 3 | 25 | 47 | 83 | 10 |
| Example 4 | 50 | 22 | 65 | 8 |
| Example 5 | 50 | 15 | 74 | 6 |
| Example 6 | 50 | 10 | 79 | 4 |
| Example 7 | 50 | 4.70 | 57 | 10 |
| Example 8 | 50 | 2.20 | 80 | 5 |
| Example 9 | 50 | 1.00 | 86 | 3 |
| Example 10 | 50 | 0.47 | 65 | 3 |
| Example 11 | 50 | 0.22 | 70 | 2 |
| Example 12 | 50 | 0.10 | 70 | 2 |

TABLE 2

|  | Rated Voltage (V) | Capacitance (nF) | The Number of Layered First Internal Electrode Layers (Count) | The Number of Layered Second Internal Electrode Layers (Count) |
| --- | --- | --- | --- | --- |
| Comparative Example 1-1 | 16 | 220 | 24 | 25 |
| Comparative Example 1-2 | 25 | 100 | 19 | 20 |
| Comparative Example 1-3 | 25 | 47 | 9 | 10 |
| Comparative Example 1-4 | 50 | 22 | 7 | 8 |
| Comparative Example 1-5 | 50 | 15 | 5 | 6 |
| Comparative Example 1-6 | 50 | 10 | 3 | 4 |
| Comparative Example 1-7 | 50 | 4.70 | 9 | 10 |
| Comparative Example 1-8 | 50 | 2.20 | 4 | 5 |
| Comparative Example 1-9 | 50 | 1.00 | 2 | 3 |
| Comparative Example 1-10 | 50 | 0.47 | 2 | 3 |
| Comparative Example 1-11 | 50 | 0.22 | 1 | 2 |
| Comparative Example 1-12 | 50 | 0.10 | 1 | 2 |

TABLE 3

|  | Rated Voltage (V) | Capacitance (nF) | The Number of Layered First Internal Electrode Layers (Count) | The Number of Layered Second Internal Electrode Layers (Count) |
| --- | --- | --- | --- | --- |
| Comparative Example 2-1 | 16 | 220 | 70 | 25 |
| Comparative Example 2-2 | 25 | 100 | 59 | 20 |
| Comparative Example 2-3 | 25 | 47 | 83 | 10 |
| Comparative Example 2-4 | 50 | 22 | 65 | 8 |
| Comparative Example 2-5 | 50 | 15 | 74 | 6 |
| Comparative Example 2-6 | 50 | 10 | 79 | 4 |
| Comparative Example 2-7 | 50 | 4.70 | 57 | 10 |
| Comparative Example 2-8 | 50 | 2.20 | 80 | 5 |
| Comparative Example 2-9 | 50 | 1.00 | 86 | 3 |
| Comparative Example 2-10 | 50 | 0.47 | 65 | 3 |
| Comparative Example 2-11 | 50 | 0.22 | 70 | 2 |
| Comparative Example 2-12 | 50 | 0.10 | 70 | 2 |

(3) Heat Generation Characteristic Test (Variation in Temperature with Variation in Current)

In samples according to Example and samples according to Comparative Example 1 and Comparative Example 2, a thermocouple was brought in contact with the surface of the multilayer body of each sample, a DC current was fed between the first external electrode and the second external electrode, and increase in surface temperature of each sample was measured. Magnitude of the current to each sample was between 0 A and about 5 A, and variation in temperature of each sample was measured for each magnitude of the current.

The samples in the heat generation characteristic test were as follows. In Example, the sample (having the capacitance of about 10 nF and including seventy-nine layered first internal electrode layers and four layered second internal electrode layers) in Example 6 was provided. In Comparative Example 1, the sample (having the capacitance of about 47 nF and including nine layered first internal electrode layers and ten layered second internal electrode layers) in Comparative Example 1-3 was provided. In Comparative Example 2, the sample (having the capacitance of about 47 nF and including eighty-three layered first internal electrode layers and ten layered second internal electrode layers) in Comparative Example 2-3 was provided. Three samples each were used, and an average value of the samples was calculated. A temperature increase value ($\Delta T$) was calculated by subtraction of a surface temperature of the multilayer body—room temperature.

(4) Test for Measuring DC Resistance (Rdc) of Internal Electrode Layer

In the samples according to Example and the samples according to Comparative Example 1, a potential difference between the first external electrode and the second external electrode was measured while a current of 100 mA was fed between the first external electrode and the second external electrode, and a value of the potential difference/100 mA was calculated as the DC resistance (Rdc). As shown in Tables 1 and 2, a value of the capacitance was different among the samples in Example and Comparative Example 1. Twenty samples were prepared for each capacitance of the samples in Example and Comparative Example 1 and an average value of the samples was calculated.

(5) Test for Checking Connection Between Internal Electrode Layer and External Electrode Among the samples according to Example and the samples according to Comparative Example 2, a sample having the DC resistance equal to or higher than a prescribed threshold value was determined as defective in connection, and a ratio of occurrence of defective connection to the total number of samples in the whole lot was calculated. As shown in Tables 1 and 3, the number of layered second internal electrode layers was different among the samples in Example and Comparative Example 2. In order to set each sample to have a prescribed capacitance, the number of layered first internal electrode layers was also varied. Ten thousand samples according to each of Example and Comparative Example 2 were prepared for each number of layered second internal electrode layers.

Figure 11:
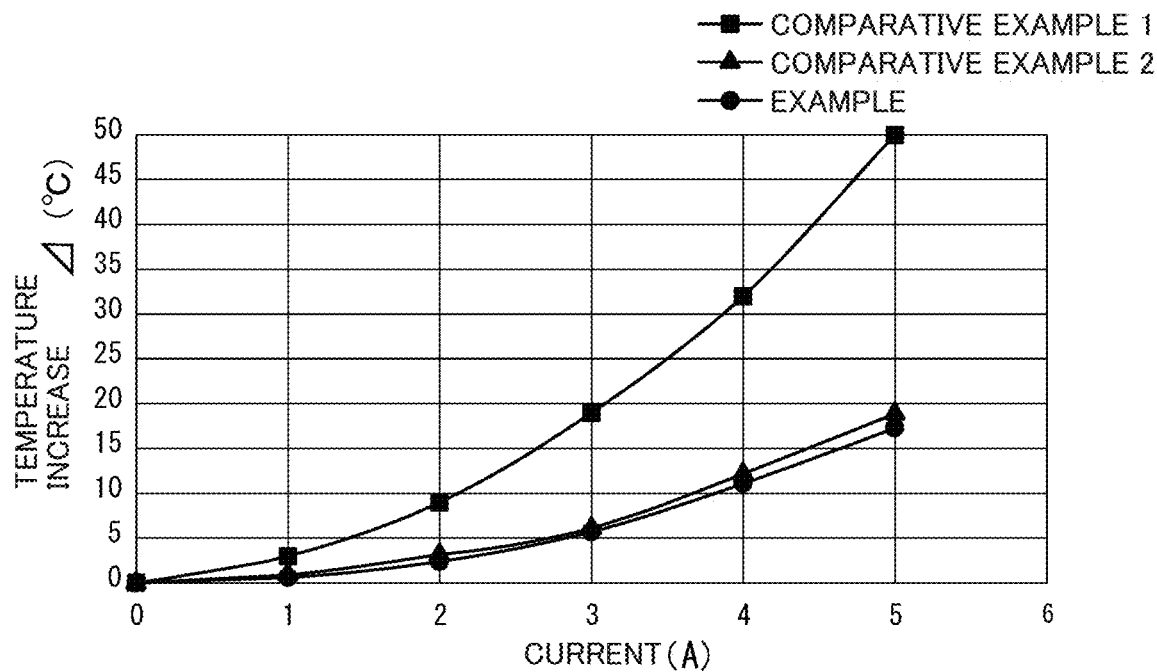
FIG. 11 is a diagram showing heat generation characteristics with variation in value of a current between external electrodes in multilayer ceramic capacitors in Example, Comparative Example 1, and Comparative Example 2.
Figure 12:
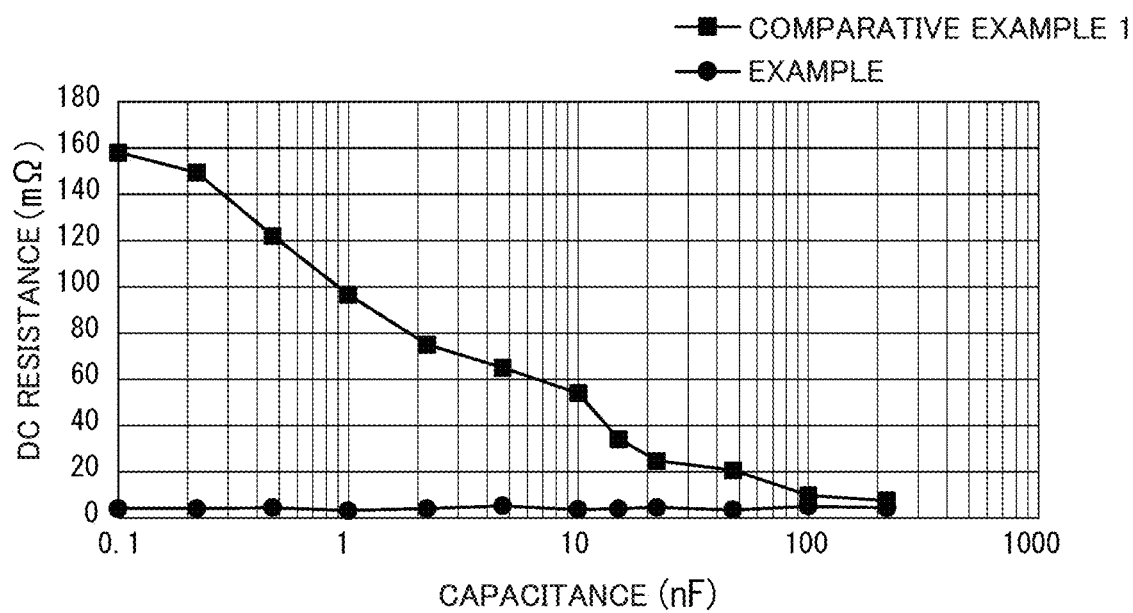
FIG. 12 is a diagram showing a value of a DC resistance depending on a difference in capacitance in multilayer ceramic capacitors in Example of a preferred embodiment of the present invention and Comparative Example 1.
Figure 13:
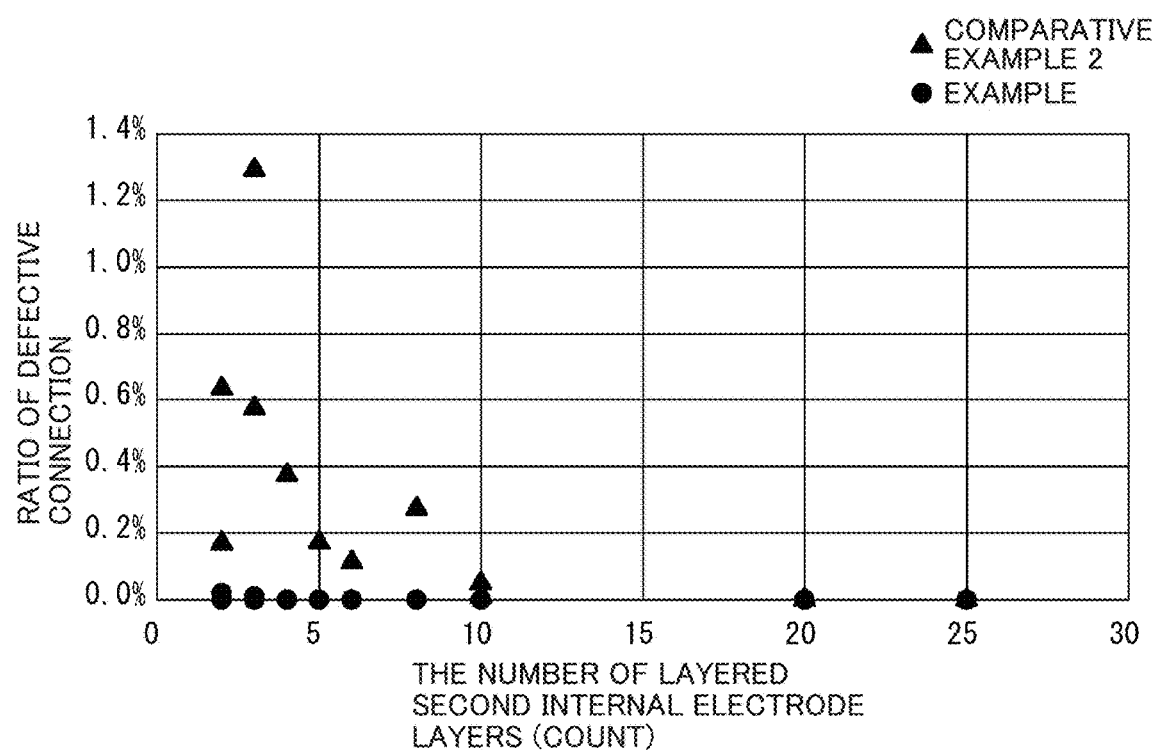
FIG. 13 is a diagram showing relation between the number of layered second internal electrodes and a ratio of defective connection in multilayer ceramic capacitors in Example and Comparative Example 2.

Regarding an evaluation result, Table 4 and FIG. 11 show results of the heat generation characteristic test, Tables 5 and 6 and FIG. 12 show results of the test to measure the DC resistance of the internal electrode layer, and Tables 7 and 8 and FIG. 13 show results of the test to check connection between the internal electrode layers and the external electrode.

TABLE 4

| Current (A) | Temperature Increase $\Delta$ (° C.) | | |
|---|---|---|---|
| | Comparative Example 1-3 | Comparative Example 2-3 | Example 6 |
| 0 | 0 | 0 | 0 |
| 1 | 3 | 0.9 | 0.7 |
| 2 | 9 | 3.2 | 2.5 |
| 3 | 19 | 6.1 | 5.8 |
| 4 | 32 | 12.2 | 11.3 |
| 5 | 50 | 18.9 | 17.6 |

TABLE 5

| | Capacitance (nF) | DC Resistance (mΩ) |
|---|---|---|
| Example 1 | 220 | 4.5 |
| Example 2 | 100 | 5.2 |
| Example 3 | 47 | 3.5 |
| Example 4 | 22 | 4.6 |
| Example 5 | 15 | 4.1 |
| Example 6 | 10 | 3.7 |
| Example 7 | 4.70 | 5.3 |
| Example 8 | 2.20 | 4.1 |
| Example 9 | 1.00 | 3.3 |
| Example 10 | 0.47 | 4.5 |
| Example 11 | 0.22 | 4.1 |
| Example 12 | 0.10 | 4.1 |

TABLE 6

| | Capacitance (nF) | DC Resistance (mΩ) |
|---|---|---|
| Comparative Example 1-1 | 220 | 7.6 |
| Comparative Example 1-2 | 100 | 9.8 |
| Comparative Example 1-3 | 47 | 20.7 |
| Comparative Example 1-4 | 22 | 24.8 |
| Comparative Example 1-5 | 15 | 34.2 |
| Comparative Example 1-6 | 10 | 54.0 |
| Comparative Example 1-7 | 4.70 | 65.0 |
| Comparative Example 1-8 | 2.20 | 75.0 |
| Comparative Example 1-9 | 1.00 | 96.7 |
| Comparative Example 1-10 | 0.47 | 122.0 |
| Comparative Example 1-11 | 0.22 | 149.4 |
| Comparative Example 1-12 | 0.10 | 158.1 |

TABLE 7

| | The Number of Layered Second Internal Electrode Layers (Count) | Ratio of Defective Connection (%) |
|---|---|---|
| Example 1 | 25 | 0.00 |
| Example 2 | 20 | 0.00 |
| Example 3 | 10 | 0.00 |
| Example 4 | 8 | 0.00 |
| Example 5 | 6 | 0.00 |
| Example 6 | 4 | 0.00 |
| Example 7 | 10 | 0.00 |
| Example 8 | 5 | 0.00 |
| Example 9 | 3 | 0.00 |
| Example 10 | 3 | 0.01 |
| Example 11 | 2 | 0.01 |
| Example 12 | 2 | 0.03 |

TABLE 8

| | The Number of Layered Second Internal Electrode Layers (Count) | Ratio of Defective Connection (%) |
|---|---|---|
| Comparative Example 2-1 | 25 | 0.00 |
| Comparative Example 2-2 | 20 | 0.00 |
| Comparative Example 2-3 | 10 | 0.01 |
| Comparative Example 2-4 | 8 | 0.27 |
| Comparative Example 2-5 | 6 | 0.11 |
| Comparative Example 2-6 | 4 | 0.37 |
| Comparative Example 2-7 | 10 | 0.05 |
| Comparative Example 2-8 | 5 | 0.17 |
| Comparative Example 2-9 | 3 | 1.29 |
| Comparative Example 2-10 | 3 | 0.57 |
| Comparative Example 2-11 | 2 | 0.63 |
| Comparative Example 2-12 | 2 | 0.17 |

(6) Results of Experiment (a) Results in Heat Generation Characteristic Test

According to Table 4 and FIG. 11, it was determined that, since the sample of the multilayer ceramic capacitor in each of Example and Comparative Example 2 included the internal electrode layered portion which was the region where at least two first internal electrode layers were successively layered, not only a larger number of first internal electrode layers were provided and a larger number of first internal electrode layers connected in parallel were provided but also conduction between the internal electrode layers and the external electrode was excellent, and hence the DC resistance was reduced and accordingly an amount of heat generation was reduced at any current value and increase in temperature could relatively be reduced.

Increase in temperature was slightly less in each sample in Example than in each sample in Comparative Example 2. This may be because, unlike each sample in Comparative Example 2, in each sample in Example, the fifth section and the sixth section of the second internal electrode layer were larger in thickness than the fourth section of the second internal electrode layer, and hence heat in the multilayer ceramic capacitor conducted to the second internal electrode layer and heat was readily radiated from the third external electrode and the fourth external electrode.

On the other hand, the sample of the multilayer ceramic capacitor in Comparative Example 1 was structured such that the first internal electrode layers and the second internal electrode layers were alternately layered. Therefore, in the sample as in Comparative Example 1-3 including a relatively small number of layered internal electrode layers of each type and being low in capacitance, not only the number of first internal electrode layers was small and the number of first internal electrode layers connected in parallel was small but also conduction between the internal electrode layers and the external electrode was lowered and hence the DC resistance was higher. It was accordingly determined that the amount of heat generation greatly increased with increase in current value and the sample in Comparative Example 1 was larger in increase in temperature than the samples in Example and Comparative Example 2.

(b) Results of Test for Measuring DC Resistance of Internal Electrode Layer

It was determined according to Table 5 and FIG. 12 that, since the sample of the multilayer ceramic capacitor in Example included the internal electrode layered portion which was the region where at least two first internal electrode layers were successively layered, not only a larger number of first internal electrode layers were provided and a larger number of first internal electrode layers connected in parallel were provided but also conduction between the internal electrode layers and the external electrode was excellent and hence the value of the DC resistance in Example 1 to Example 12 was relatively as low as 5.5 mΩ, or lower at any capacitance.

On the other hand, it was determined according to Table 6 and FIG. 12 that, since the sample of the multilayer ceramic capacitor in Comparative Example 1 was structured such that the first internal electrode layers and the second internal electrode layers were alternately layered and the number of layered first internal electrode layers and the number of layered second internal electrode layers decreased in the order from Comparative Example 1-1 to Comparative Example 1-6 and from Comparative Example 1-7 to Comparative Example 1-12 to lower the capacitance, the value of the DC resistance greatly increased.

(c) Results of Test for Checking Connection Between Internal Electrode Layer and External Electrode It was determined according to Table 7 and FIG. 13 that, since the fifth section of the second internal electrode layer connected to the third external electrode and the sixth section of the second internal electrode layer connected to the fourth external electrode were larger in thickness than the fourth section of the second internal electrode layer in the sample of the multilayer ceramic capacitor in Example, defective connection did not occur in Examples 1 to 9 and substantially no defective connection occurred as exemplified as a ratio of defective connection being 0.01% in Example 10 where three second internal electrode layers were layered, a ratio of defective connection being 0.01% in Example 11 where two second internal electrode layers were layered, and a ratio of defective connection being 0.03% in Example 12 where two second internal electrode layers were layered.

On the other hand, it was determined according to Table and FIG. 13 that, in the sample of the multilayer ceramic capacitor in Comparative Example 2, the thickness of the fifth section of the second internal electrode layer connected to the third external electrode and the sixth section of the second internal electrode layer connected to the fourth external electrode was identical to the thickness of the fourth section of the second internal electrode layer which was relatively small, and in particular in Comparative Examples 2-4 to 2-6 and Comparative Examples 2-8 to 2-12, the number of layered second internal electrode layers was eight or smaller, and therefore the ratio of defective connection was 0.1% or higher and defective connection between the second internal electrode layer and the external electrode was likely.

As set forth above, it was determined that, in the sample of the multilayer ceramic capacitor according to Example, the first internal electrode layers were larger in number than the second internal electrode layers and at least two first internal electrode layers were successively layered, and hence not only a larger number of first internal electrode layers were provided and a larger number of first internal electrode layers connected in parallel were provided while increase in capacitance of the multilayer ceramic capacitor was significantly reduced or prevented, but also conduction between the internal electrode layers and the external electrode was significantly improved and increase in DC resistance could be significantly reduced or prevented.

It was determined that, in the multilayer ceramic capacitor according to the preferred embodiments of the present invention, the fifth section and the sixth section of the second internal electrode layer were larger in thickness than the fourth section of the second internal electrode layer, and hence even when the number of the second internal electrode layers was reduced to lower the capacitance of the multilayer ceramic capacitor, connectivity between the second internal electrode layer and the third external electrode and connectivity between the second internal electrode layer and the fourth external electrode could sufficiently be secured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of layered dielectric layers, the multilayer body including a first main surface and a second main surface opposed to each other in a height direction, a first end surface and a second end surface opposed to each other in a length direction orthogonal to the height direction, and a first side surface and a second side surface opposed to each other in a width direction orthogonal to the height direction and the length direction;
a plurality of first internal electrode layers on the plurality of dielectric layers and drawn to the first end surface and the second end surface;
a plurality of second internal electrode layers on the plurality of dielectric layers and drawn to the first side surface and the second side surface;
a first external electrode on the first end surface and connected to the first internal electrode layers;
a second external electrode on the second end surface and connected to the first internal electrode layers;
a third external electrode on the first side surface and connected to the second internal electrode layers; and
a fourth external electrode on the second side surface and connected to the second internal electrode layers; wherein
each of the second internal electrode layers includes a central section located in a central portion of the dielectric layer and an extending section that extends from the central section located in the central portion of the dielectric layer to the first side surface and the second side surface;
the first internal electrode layers are larger in number than the second internal electrode layers, at least two of the first internal electrode layers are successively layered, and the extending section is larger in thickness than the central section located in the central portion of the dielectric layer; and
a thickness of each of the second internal electrode layers is larger than a thickness of each of the first internal electrode layers.

2. The multilayer ceramic capacitor according to claim 1, wherein the second internal electrode layers divide a region where the at least two of the first internal electrode layers are successively layered into a plurality of regions.

3. The multilayer ceramic capacitor according to claim 2, wherein a single second internal electrode layer divides the region where the at least two of the first internal electrode layers are successively layered into the plurality of regions.

4. The multilayer ceramic capacitor according to claim 2, wherein at least two of the second internal electrode layers are successively layered to divide the region where the at least two of the first internal electrode layers are successively layered into the plurality of regions.

5. The multilayer ceramic capacitor according to claim 1, wherein at least one of the second internal electrode layers is provided between a region where at least two of the first internal electrode layers located on a side of the first main surface are successively layered and the first main surface, and at least one of the second internal electrode layers is provided between a region where at least two of the first internal electrode layers located on a side of the second main surface are successively layered and the second main surface.

6. The multilayer ceramic capacitor according to claim 1, wherein the second internal electrode layers are not provided between a region where at least two of the first internal electrode layers located on a side of the first main surface are successively layered and the first main surface, and the second internal electrode layers are not provided between a region where at least two of the first internal electrode layers located on a side of the second main surface are successively layered and the second main surface.

7. The multilayer ceramic capacitor according to claim 1, wherein a dielectric layer adjacent to at least one of the second internal electrode layers has a larger thickness than a dielectric layer lying between the first internal electrode layers.

8. The multilayer ceramic capacitor according to claim 1, wherein a relationship of A≥B is satisfied, where A represents a width of the central section located in the central portion of the dielectric layer in the length direction that connects between the first end surface and the second end surface and B represents a width of the extending section in the length direction that connects between the first end surface and the second end surface.

9. The multilayer ceramic capacitor according to claim 1, wherein the extending section is exposed at the first side surface and the second side surface of the multilayer body.

10. The multilayer ceramic capacitor according to claim 1, wherein each of the first internal electrode layers includes a first section located in a central portion of the dielectric layer, a second section that extends from the first section to the first end surface, and a third section that extends from the first section to the second end surface.

11. The multilayer ceramic capacitor according to claim 10, wherein the second section is exposed at the first end surface, and the third section is exposed at the second end surface.

12. The multilayer ceramic capacitor according to claim 1, wherein the first internal electrode layers are provided on dielectric layers that are different from the dielectric layers on which the second internal electrode layers are provided.

13. The multilayer ceramic capacitor according to claim 1, wherein a ratio of a thickness of the central section of the each of the second internal electrode layers to a thickness of the extending section of each of the second internal electrode layers is greater than or equal to about 1.2.

14. The multilayer ceramic capacitor according to claim 1, wherein
the first external electrode extends from the first end surface of the multilayer body to cover a portion of each of the first main surface, the second main surface, the first side surface, and the second side surface;
the second external electrode extends from the second end surface of the multilayer body to cover a portion of each of the first main surface, the second main surface, the first side surface, and the second side surface;
the third external electrode extends from the first side surface to cover a portion of each of the first main surface and the second main surface, and
the fourth external electrode extends from the second side surface to cover a portion of each of the first main surface and the second main surface.

15. The multilayer ceramic capacitor according to claim 1, wherein each of the first, second, third, and fourth external electrodes includes an underlying electrode layer on the multilayer body and a plated layer that covers the underlying electrode layer.

16. The multilayer ceramic capacitor according to claim 15, wherein the underlying electrode layer includes a plurality of underlying electrode layers.

17. The multilayer ceramic capacitor according to claim 15, wherein the underlying electrode layer includes at least one of a baked layer, a conductive resin layer, or a thin layer.

18. The multilayer ceramic capacitor according to claim 15, wherein
the plated layer does not include glass; and
a ratio of a metal per unit volume of the plated layer is preferably not lower than about 99 volume %.

* * * * *